(12) United States Patent
Zhang et al.

(10) Patent No.: US 12,126,953 B2
(45) Date of Patent: Oct. 22, 2024

(54) ACOUSTIC OUTPUT APPARATUS

(71) Applicant: SHENZHEN SHOKZ CO., LTD., Guangdong (CN)

(72) Inventors: Lei Zhang, Shenzhen (CN); Junjiang Fu, Shenzhen (CN); Bingyan Yan, Shenzhen (CN); Fengyun Liao, Shenzhen (CN); Xin Qi, Shenzhen (CN)

(73) Assignee: SHENZHEN SHOKZ CO., LTD., Shenzhen (CN)

( * ) Notice: Subject to any disclaimer, the term of this patent is extended or adjusted under 35 U.S.C. 154(b) by 0 days.

(21) Appl. No.: 18/314,170

(22) Filed: May 9, 2023

(65) Prior Publication Data

US 2023/0276161 A1 Aug. 31, 2023

Related U.S. Application Data

(63) Continuation of application No. 17/931,082, filed on Sep. 9, 2022, now Pat. No. 11,671,738, which is a
(Continued)

(30) Foreign Application Priority Data

| Apr. 30, 2019 | (CN) | 201910364346.2 |
| Sep. 19, 2019 | (CN) | 201910888067.6 |
| Sep. 19, 2019 | (CN) | 201910888762.2 |

(51) Int. Cl.
*H04R 1/10* (2006.01)
*G02C 11/00* (2006.01)
(Continued)

(52) U.S. Cl.
CPC ........... *H04R 1/1016* (2013.01); *G02C 11/00* (2013.01); *G02C 11/10* (2013.01); *G06F 3/16* (2013.01);
(Continued)

(58) Field of Classification Search
CPC ........ H04R 1/1016; H04R 1/02; H04R 1/026; H04R 1/028; H04R 1/10; H04R 1/1008;
(Continued)

(56) References Cited

U.S. PATENT DOCUMENTS 3,794,779 A * 2/1974 Greuzerd ............... H04R 5/033
381/5
5,775,855 A 7/1998 Reiterman et al.
(Continued)

FOREIGN PATENT DOCUMENTS

| CN | 109151680 A | 1/2019 |
| WO | 0225990 A1 | 3/2002 |

OTHER PUBLICATIONS

International Search Report in PCT/CN2019/130942 mailed on Mar. 26, 2020, 7 pages.
(Continued)

*Primary Examiner* — Mark Fischer
(74) *Attorney, Agent, or Firm* — METIS IP LLC

(57) ABSTRACT

The present disclosure discloses an acoustic output apparatus including at least one acoustic driver, a controller, and a supporting structure. The at least one acoustic driver may be configured to output sounds through at least two sound guiding holes. The at least two sound guiding holes may include a first sound guiding hole and a second sound guiding hole. The controller may be configured to control a phase and an amplitude of the sounds generated by the at least one acoustic driver using a control signal such that the sounds output by the at least one acoustic driver through the first and second sound guiding holes have opposite phases. The supporting structure may be provided with a baffle and configured to support the at least one acoustic driver such that the first and second sound guiding holes are located on both sides of the baffle.

16 Claims, 29 Drawing Sheets

Related U.S. Application Data continuation of application No. 17/320,259, filed on May 14, 2021, now Pat. No. 11,457,301, which is a continuation of application No. PCT/CN2019/130942, filed on Dec. 31, 2019.

(51) Int. Cl.

| | |
|---|---|
| *G06F 3/16* | (2006.01) |
| *G10L 21/0208* | (2013.01) |
| *G10L 21/038* | (2013.01) |
| *H04M 1/03* | (2006.01) |
| *H04M 1/78* | (2006.01) |
| *H04R 1/02* | (2006.01) |
| *H04R 1/22* | (2006.01) |
| *H04R 1/24* | (2006.01) |
| *H04R 1/26* | (2006.01) |
| *H04R 1/28* | (2006.01) |
| *H04R 1/34* | (2006.01) |
| *H04R 1/38* | (2006.01) |
| *H04R 1/44* | (2006.01) |
| *H04R 3/00* | (2006.01) |
| *H04R 3/02* | (2006.01) |
| *H04R 5/02* | (2006.01) |
| *H04R 5/033* | (2006.01) |
| *H04R 9/06* | (2006.01) |
| *H04S 7/00* | (2006.01) |
| *H04W 4/80* | (2018.01) |
| *G02C 11/06* | (2006.01) |
| *G10L 21/0216* | (2013.01) |

(52) U.S. Cl.
CPC .............. *G06F 3/162* (2013.01); *G06F 3/165* (2013.01); *G10L 21/0208* (2013.01); *G10L 21/038* (2013.01); *H04M 1/03* (2013.01); *H04M 1/035* (2013.01); *H04M 1/78* (2013.01); *H04R 1/02* (2013.01); *H04R 1/026* (2013.01); *H04R 1/028* (2013.01); *H04R 1/10* (2013.01); *H04R 1/1008* (2013.01); *H04R 1/1025* (2013.01); *H04R 1/1041* (2013.01); *H04R 1/105* (2013.01); *H04R 1/1075* (2013.01); *H04R 1/1083* (2013.01); *H04R 1/22* (2013.01); *H04R 1/24* (2013.01); *H04R 1/245* (2013.01); *H04R 1/26* (2013.01); *H04R 1/28* (2013.01); *H04R 1/2803* (2013.01); *H04R 1/2807* (2013.01); *H04R 1/2811* (2013.01); *H04R 1/2896* (2013.01); *H04R 1/34* (2013.01); *H04R 1/342* (2013.01); *H04R 1/345* (2013.01); *H04R 1/347* (2013.01); *H04R 1/38* (2013.01); *H04R 1/44* (2013.01); *H04R 3/00* (2013.01); *H04R 3/005* (2013.01); *H04R 3/02* (2013.01); *H04R 5/02* (2013.01); *H04R 5/033* (2013.01); *H04R 5/0335* (2013.01); *H04R 9/06* (2013.01); *H04S 7/304* (2013.01); *H04W 4/80* (2018.02); *G02C 11/06* (2013.01); *G10L 2021/02166* (2013.01); *H04R 2201/103* (2013.01); *H04R 2410/05* (2013.01); *H04R 2420/07* (2013.01); *H04S 2400/11* (2013.01)

(58) Field of Classification Search
CPC .... H04R 1/1025; H04R 1/1041; H04R 1/105; H04R 1/1075; H04R 1/1083; H04R 1/22; H04R 1/24; H04R 1/245; H04R 1/26; H04R 1/28; H04R 1/2803; H04R 1/2807; H04R 1/2811; H04R 1/2896; H04R 1/34; H04R 1/342; H04R 1/345; H04R 1/347; H04R 1/38; H04R 1/44; H04R 3/00; H04R 3/005; H04R 3/02; H04R 5/02; H04R 5/033; H04R 5/0335; H04R 9/06; H04R 2201/103; H04R 2410/05; H04R 2420/07; H04W 4/80; G02C 11/00; G02C 11/10; G02C 11/06; G06F 3/16; G06F 3/162; G06F 3/165; G10L 21/0208; G10L 21/038; G10L 2021/02166; H04M 1/03; H04M 1/035; H04M 1/78; H04S 7/304; H04S 2400/11

See application file for complete search history.

(56) References Cited

U.S. PATENT DOCUMENTS

| | | | |
|---|---|---|---|
| 6,817,440 | B1 | 11/2004 | Kim |
| 9,571,917 | B2 | 2/2017 | Litovsky et al. |
| 9,794,676 | B2 | 10/2017 | Shetye et al. |
| 9,794,677 | B2 | 10/2017 | Shetye et al. |
| 9,838,787 | B1 | 12/2017 | Jeffery et al. |
| 9,949,030 | B2 | 4/2018 | Sun et al. |
| 10,231,052 | B2 | 3/2019 | Jeffery et al. |
| 2007/0041590 | A1 | 2/2007 | Tice |
| 2007/0098198 | A1 | 5/2007 | Hildebrandt |
| 2016/0021449 | A1 | 1/2016 | Litovsky et al. |
| 2016/0127841 | A1 | 5/2016 | Horii |
| 2017/0353793 | A1* | 12/2017 | Sun ................... H04R 3/12 |
| 2017/0353796 | A1 | 12/2017 | Jeffery et al. |
| 2018/0048952 | A1 | 2/2018 | Hong et al. |
| 2018/0227660 | A1 | 8/2018 | Azmi et al. |
| 2019/0046794 | A1* | 2/2019 | Goodall ............ A61N 1/36014 |
| 2019/0052954 | A1* | 2/2019 | Rusconi Clerici Beltrami ........... G10K 11/26 |

OTHER PUBLICATIONS

Written Opinion in PCT/CN2019/130942 mailed on Mar. 26, 2020, 8 pages.

Allan D. Pierce, Reflection, Transmission, and Excitation of Plane Waves, Acoustics: An Introduction to its Physical Principles and Applications, 2019, 61 pages.

* cited by examiner

100

300

ACOUSTIC OUTPUT APPARATUS

CROSS-REFERENCE TO RELATED APPLICATIONS

This application is a Continuation of U.S. application Ser. No. 17/931,082, filed on Sep. 9, 2022, which is a Continuation of U.S. application Ser. No. 17/320,259 (now U.S. Pat. No. 11,457,301), filed on May 14, 2021, which is a Continuation of International Application No. PCT/CN2019/130942, filed on Dec. 31, 2019, which claims priority to Chinese Patent Application No. 201910364346.2 filed on Apr. 30, 2019, and Chinese Patent Application No. 201910888762.2 filed on Sep. 19, 2019, and Chinese Patent Application No. 201910888067.6 filed on Sep. 19, 2019, the contents of each of which are hereby incorporated by reference.

TECHNICAL FIELD

The present disclosure relates to the field of acoustics, and more particularly, relates to an acoustic output apparatus.

BACKGROUND

An open-ear acoustic output apparatus is a portable acoustic output apparatus that realizes sound conduction in a specific range. Compared with traditional in-ear and over-ear headphones, the open-ear acoustic output apparatus has characteristics of not blocking or covering an ear canal, which may allow a user to obtain sound information in external environment while listening to music, thereby improving the safety and comfort level. Due to an open structure, a leaked sound of the open-ear acoustic output apparatus is more serious than that of a traditional earphone. Generally, two or more sound sources are used to construct a specific sound field and adjust a sound pressure distribution to reduce the leaked sound, which can reduce the leaked sound to a certain extent, but there are still certain limitations. For example, a volume of the sound sent to the user may be reduced while the leaked sound is suppressed. In addition, because sounds at different frequencies have different wavelengths, the suppression effect of the leaked sound at high-frequency is not good.

Therefore, it is desirable to provide an acoustic output apparatus that can simultaneously increase a volume of the sound heard by the user and reduce the leaked sound.

SUMMARY

According to one aspect of the present disclosure, an acoustic output apparatus is provided. The acoustic output apparatus may include at least one acoustic driver configured to output sounds through at least two sound guiding holes. The at least two sound guiding holes may include a first sound guiding hole and a second sound guiding hole. The acoustic output apparatus may include a controller configured to control a phase and an amplitude of the sounds generated by the at least one acoustic driver using a control signal such that the sounds output by the at least one acoustic driver through the first and second sound guiding holes have opposite phases. The acoustic output apparatus may include a supporting structure provided with a baffle. The supporting structure may be configured to support the at least one acoustic driver such that the first and second sound guiding holes are located on both sides of the baffle.

In some embodiments, the at least one acoustic driver may include a vibration diaphragm. A first side of the vibration diaphragm in the supporting structure may be provided with a first chamber for transmitting sound. The first chamber may be acoustically coupled with the first sound guiding hole. A second side of the vibration diaphragm in the supporting structure may be provided with a second chamber for transmitting sound. The second chamber may be acoustically coupled with the second sound guiding hole.

In some embodiments, a first acoustic route from the vibration diaphragm to the first sound guiding hole may be different from a second acoustic route from the vibration diaphragm to the second sound guiding hole.

In some embodiments, a ratio of a length of the first acoustic route to a length of the second acoustic route may be 0.5-2.

In some embodiments, the sounds output from the first and second sound guiding holes may have different sound pressure amplitudes.

In some embodiments, the at least one acoustic driver may include a first acoustic driver and a second acoustic driver. The controller may be configured to control the first acoustic driver to output a first sound through the first sound guiding hole and the second acoustic driver to output a second sound from the second sound guiding hole. The first sound and the second sound may have opposite phases.

In some embodiments, a first acoustic route from the first acoustic driver to the first sound guiding hole may be different from a second acoustic route from the second acoustic driver to the second sound guiding hole.

In some embodiments, a ratio of the first acoustic route from the first acoustic driver to the first sound guiding hole and the second acoustic route from the second acoustic driver to the second sound guiding hole may be 0.5-2.

In some embodiments, the first sound and the second sound may have different sound pressure amplitudes.

In some embodiments, a distance between the first sound guiding hole and the second sound guiding hole may be less than or equal to 12 centimeters.

In some embodiments, the first sound guiding hole and a user's ear may be located on one side of the baffle. The second sound guiding hole may be located on the other side of the baffle. A length of an acoustic route from the first sound guiding hole to the user's ear may be less than a length of an acoustic route from the second sound guiding hole to the user's ear.

In some embodiments, the first and second sound guiding holes may be located on a same side of a user's ear. A ratio of a distance between the user's ear and a sound guiding hole that is closer to the user's ear among the first and second sound guiding holes to a distance between the first and second sound guiding holes may be less than or equal to 3.

In some embodiments, the first and second sound guiding holes may be located on a same side of a user's ear. A ratio of a distance between the user's ear and a sound guiding hole that is closer to the user's ear among the first and second sound guiding holes to a distance between the first and second sound guiding holes may be less than or equal to 1.

In some embodiments, the first and second sound guiding holes may be located on a same side of a user's ear. A ratio of a distance between the user's ear and a sound guiding hole that is closer to the user's ear among the first and second sound guiding holes to a distance between the first and second sound guiding holes may be less than or equal to 0.9.

In some embodiments, a ratio of a distance between a center of the baffle and a connection line between the first and second sound guiding holes to a height of the baffle may be less than or equal to 2.

In some embodiments, the at least two sound guiding holes may include a third sound guiding hole and a fourth sound guiding hole. A ratio of a distance between the third sound guiding hole and the baffle to a distance between the fourth sound guiding hole and the baffle may be less than or equal to ⅔.

BRIEF DESCRIPTION OF THE DRAWINGS

The present disclosure is further illustrated in terms of exemplary embodiments. These exemplary embodiments are described in detail with reference to the drawings. These embodiments are not restrictive. In these embodiments, the same number represents the same structure, wherein.

DETAILED DESCRIPTION

Figure 1:
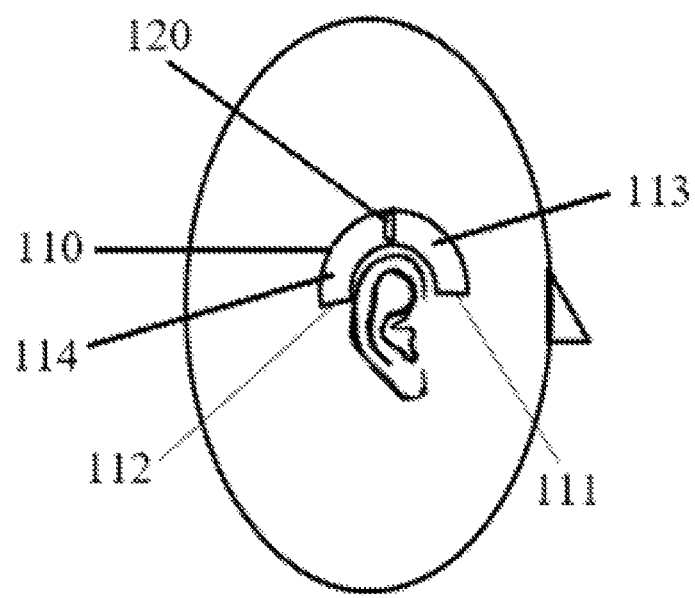
FIG. 1 is a schematic diagram illustrating an exemplary structure of an acoustic output apparatus according to some embodiments of the present disclosure.

In order to illustrate the technical solutions related to the embodiments of the present disclosure, a brief introduction of the drawings referred to in the description of the embodiments is provided below. Obviously, the drawings described below are only some examples or embodiments of the present disclosure. Those having ordinary skills in the art, without further creative efforts, may apply the present disclosure to other similar scenarios according to these drawings. Unless stated otherwise or obvious from the context, the same reference numeral in the drawings refers to the same structure and operation.

It will be understood that the terms "system," "device," "unit," and/or "module" are used herein to distinguish different components, elements, parts, sections, or assemblies of different levels. However, if other expressions may achieve the same purpose, the terms may be replaced by the other expressions.

As used in the present disclosure and the appended claims, the singular forms "a," "an," and "the" include plural referents unless the content clearly dictates otherwise. It will be further understood that the terms "comprises," "comprising," "includes," and/or "including" when used in the present disclosure, specify the presence of stated steps and elements, but do not preclude the presence or addition of one or more other steps and elements.

According to some embodiments of the present disclosure, flow charts are used to illustrate the operations performed by the system. It is to be expressly understood, the operations above or below may or may not be implemented in order. Conversely, the operations may be performed in inverted order, or simultaneously. Besides, one or more other operations may be added to the flowcharts, or one or more operations may be omitted from the flowchart.

The present disclosure describes an acoustic output apparatus including at least one acoustic driver. When a user wears the acoustic output apparatus, the acoustic output apparatus may be at least located on a side of a head of the user, close to but not blocking ears of the user. The acoustic output apparatus may be worn on the head of the user (e.g., non-ear open earphones that have the same or similar wearing style as glasses, headbands, or other structures) or other portions (e.g., a neck/shoulder area of the user) of a body of the user, or placed near the ears of the user by other manners (e.g., handheld by the user). The sound generated by the at least one acoustic driver in the acoustic output apparatus may be transmitted outwards through two sound guiding holes acoustically coupled with the at least one acoustic driver. For example, the two sound guiding holes may respectively transmit sounds with a same (or approximately same) amplitude and opposite (or approximately opposite) phases outwards. In some embodiments, the two sound guiding holes may be distributed on both sides of a user's auricle. In such cases, the user's auricle may be served as a baffle to separate the two sound guiding holes, so that acoustic routes from the two sound guiding holes to the user's ear canal may be different. In some embodiments, a baffle structure may be provided on the acoustic output apparatus, so that the two sound guiding holes may be respectively located on both sides of the baffle, which may increase an acoustic distance difference of sounds transmitted from the two sound guiding holes to a user's ear (that is, a difference in sound distances from the two sound guiding holes to the user's ear canal), thereby weakening the effect of sound cancellation, increasing a volume of sound heard by the user's ear (also referred to as near-field sound or heard sound), and providing the user with a better listening experience. In addition, the baffle may have little effect on sounds transmitted from the sound guiding holes to the environment (also referred to as far-field sound). The far-field sounds generated by the two sound guiding holes may cancel each other, which may suppress the sound leakage of the acoustic output apparatus and prevent the sound generated by the acoustic output apparatus from being heard by others near the user.

FIG. 1 is a schematic diagram illustrating an exemplary structure of an acoustic output apparatus according to some embodiments of the present disclosure. As shown in FIG. 1, the acoustic output apparatus 100 may include a supporting structure 110, an acoustic driver 120, and a controller (not shown in FIG. 1) disposed in the supporting structure 110. In some embodiments, the acoustic output apparatus 100 may be worn on the user's body (for example, human body's head, neck, or upper torso) through the supporting structure 110. At the same time, the supporting structure 110 and the acoustic driver 120 may approach but not block the ear canal, so that the user's ears may remain open, thus the user may hear both the sound output from the acoustic output apparatus 100 and the sound of the external environment. For example, the acoustic output apparatus 100 may be arranged around or partially around the user's ear, and transmit sounds by means of air conduction or bone conduction.

The supporting structure 110 may be used to be worn on the user's body and include one or more acoustic drivers 120. In some embodiments, the supporting structure 110 may have an enclosed shell structure with a hollow interior, and the one or more acoustic drivers 120 may be located inside the supporting structure 110. In some embodiments, the acoustic output apparatus 100 may be combined with a product, such as glasses, headsets, head-mounted display devices, AR/VR helmets, etc. In this case, the supporting structure 110 may be fixed near the user's ear in a hanging or clamping manner. In some alternative embodiments, a hook may be provided on the supporting structure 110, and the shape of the hook may match the shape of the user's auricle, so that the acoustic output apparatus 100 may be independently worn on the user's ear through the hook. The independently worn acoustic output apparatus 100 may communicate with a signal source (for example, a computer, a mobile phone, or other mobile devices) in a wired or wireless (for example, Bluetooth) manner. For example, the acoustic output apparatus 100 at the left and right ears may be directly in communication connection with the signal source in a wireless manner. As another example, the acoustic output apparatus 100 at the left and right ears may include a first output apparatus and a second output apparatus, the first output apparatus may be in communication connection with the signal source, and the second output apparatus may be connected with the first output apparatus wirelessly. The audio output of the first output apparatus and the second output apparatus may be synchronized through one or more synchronization signals. A wireless connection disclosed herein may include but not be limited to Bluetooth, a local area network, a wide area network, a wireless personal area network, a near field communication, or the like, or any combination thereof.

In some embodiments, the supporting structure 110 may be a shell structure with a shape suitable for human ears, for example, a circular ring shape, an oval shape, a polygonal shape (regular or irregular), a U shape, a V shape, and a semi-circle, so that the supporting structure 110 may be directly hooked at the user's ear. In some embodiments, the supporting structure 110 may also include one or more fixed structures. The fixed structure(s) may include an ear hook, a head strip, or an elastic band, so that the acoustic output apparatus 100 may be better fixed on the user, preventing the acoustic output apparatus 100 from falling. Merely by way of example, the elastic band may be a headband to be worn around the head region. As another example, the elastic band may be a neckband to be worn around the neck/shoulder area. In some embodiments, the elastic band may be a continuous band and be elastically stretched to be worn on the user's head. In the meanwhile, the elastic band may also exert pressure on the user's head so that the acoustic output apparatus 100 may be fixed to a specific position of the user's head. In some embodiments, the elastic band may be a discontinuous band. For example, the elastic band may include a rigid portion and a flexible portion. The rigid portion may be made of a rigid material (for example, plastic or metal), and the rigid portion may be fixed to the supporting structure 110 of the acoustic output apparatus 100 by a physical connection (for example, a clamping connection, a threaded connection, etc.). The flexible portion may be made of an elastic material (for example, cloth, composite material, or/and neoprene).

In some embodiments, when the user wears the acoustic output apparatus 100, the supporting structure 110 may be located above or below the auricle. The supporting structure 110 may also be provided with a sound guiding hole 111 and a sound guiding hole 112 for transmitting sound. In some embodiments, the sound guiding hole 111 and the sound guiding hole 112 may be located on both sides of the user's auricle, respectively, and the acoustic driver 120 may output sounds through the sound guiding hole 111 and the sound guiding hole 112.

The acoustic driver 120 may be a component that can receive an electrical signal, and convert the electrical signals into a sound signal for output. In some embodiments, in terms of frequency, the type of acoustic driver 120 may include an acoustic driver with a low-frequency (for example, 30 Hz-150 Hz), an acoustic driver with a mid-low-frequency (for example, 150 Hz-500 Hz), an acoustic driver with a mid-high-frequency (for example, 500 Hz-5 kHz), an acoustic driver with a high-frequency (for example, 5 kHz-16 kHz), or an acoustic driver with a full-frequency (for example, 30 Hz-16 kHz), or the like, or any combination thereof. Of course, the low frequency, high frequency, etc. mentioned herein may merely represent an approximate range of the frequency, and different division manners may be used in different application scenarios. For example, a frequency division point may be determined. Low frequency may represent a frequency range below the frequency division point, and high frequency may represent a frequency range above the frequency division point. The frequency division point may be an arbitrary value within the audible range of the human ear, for example, 500 Hz, 600 Hz, 700 Hz, 800 Hz, 1000 Hz, etc. In some embodiments, in terms of a principle, the acoustic driver 120 may include but is not limited to a moving coil driver, a moving iron driver, a piezoelectric driver, an electrostatic driver, a magnetostrictive driver, or the like.

In some embodiments, the acoustic driver 120 may include a vibration diaphragm. When the vibration diaphragm vibrates, sound may be transmitted from the front and rear sides of the vibration diaphragm, respectively. In some embodiments, the front side of the vibration diaphragm in the supporting structure 110 may be provided with a front chamber 113 for transmitting sound. The front chamber 113 may be acoustically coupled with the sound guiding hole 111, and the sound on the front side of the vibration diaphragm may be outputted from the sound guiding hole 111 through the front chamber 113. The rear side of the vibration diaphragm in the supporting structure 110 may be provided with a rear chamber 114 for transmitting sound. The rear chamber 114 may be acoustically coupled with the sound guiding hole 112, and the sound on the rear side of the vibration diaphragm may be outputted from the sound guiding hole 112 through the rear chamber 114. It should be noted that, when the vibration diaphragm is vibrating, the front side and the rear side of the vibration diaphragm may simultaneously generate sounds with opposite phases. After passing through the front chamber 113 and the rear chamber 114, respectively, the sounds may propagate outward from the positions of the sound guiding hole 111 and the sound guiding hole 112, respectively. In some embodiments, by adjusting the structure of the front chamber 113 and the rear chamber 114, the sounds output by the acoustic driver 120 at the sound guiding hole 111 and the sound guiding hole 112 may meet specific conditions. For example, by designing the lengths of the front chamber 113 and the rear chamber 114, the sound guiding hole 111 and the sound guiding hole 112 may output sounds with a specific phase relationship (for example, opposite phases). Therefore, the problems including a small volume of the sound heard by the user in the near field of the acoustic output apparatus 100 and a large sound leakage in the far field of the acoustic output apparatus 100 may be effectively resolved.

In some alternative embodiments, the acoustic driver 120 may also include a plurality of vibration diaphragms (for example, two vibration diaphragms). Each of the plurality of vibration diaphragms may vibrate respectively to generate sounds, which may respectively pass through different cavities connected to the vibration diaphragms in the supporting structure, and output from corresponding sound guiding holes. The plurality of vibration diaphragms may be controlled by the same controller or different controllers and generate sounds that meet certain phase and amplitude conditions (for example, sounds with the same amplitude but opposite phases, sounds with different amplitudes and opposite phases, etc.).

The controller may be used to control a phase and an amplitude of a sound generated by the acoustic driver 112. In some embodiments, a count of controllers in the acoustic output apparatus 100 may be one or more. For example, when the acoustic output apparatus 100 includes a plurality of acoustic drivers 112, the count of controllers may be one. The controller may control, using a control signal, the plurality of acoustic drivers simultaneously 112 to generate sounds that meet a certain phase and amplitude condition. As another example, the count of controllers in the acoustic output apparatus 100 may be equal to the count of acoustic drivers. Each controller may control an acoustic driver corresponding to the controller to generate a sound that meets the certain phase and amplitude condition.

Figure 2:
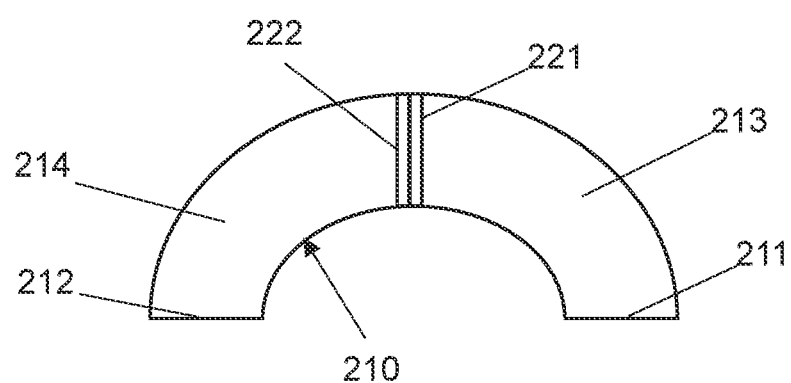
FIG. 2 is a schematic diagram illustrating an exemplary structure of an acoustic output apparatus according to some embodiments of the present disclosure.

In order to further explain the specific structure of the acoustic output apparatus 100, the present disclosure takes an acoustic output apparatus including two acoustic drivers as an example. As shown in FIG. 2, an acoustic output apparatus 200 may include a supporting structure 210, a first acoustic driver 221, a second acoustic driver 222, and a controller (not shown in FIG. 2). The supporting structure 110 may be provided with a sound guiding hole 211 and a sound guiding hole 212 for outputting sound. The first acoustic driver 221, the second acoustic driver 222, and the controller may be disposed inside the supporting structure 210. The controller may control the first acoustic driver 221 and the second acoustic driver 222 to generate sounds that meet the certain phase and amplitude condition (for example, sounds with a same amplitude but opposite phases, sounds with different amplitudes and opposite phases, etc.) using a control signal. In some embodiments, the sound guiding hole 211 and the sound guiding hole 212 may be located on both sides of the user's auricle. The first acoustic driver 221 may output sound through the sound guiding hole 211, and the second acoustic driver 221 may output sound through the sound guiding hole 212.

In some embodiments, a cavity 213 for transmitting sound may be provided between the first acoustic driver 221 and the sound guiding hole 211 in the supporting structure 210. The sound generated by the first acoustic driver 211 may be transmitted through the cavity 213 and outputted from the sound guiding hole 211. A cavity 214 for transmitting sound may be provided between the second acoustic driver 222 and the sound guiding hole 212 in the supporting structure 210. The sound generated by the second acoustic driver 222 may be transmitted through the cavity 214 and outputted from the sound guiding hole 212. In some embodiments, the controller may control the first acoustic driver 221 and the second acoustic driver 222 to simultaneously generate a set of sounds with opposite phases by a control signal. For example, if the first acoustic driver 221 and the second acoustic driver 222 have the same frequency response characteristic, the controller may adjust electrical signals input into the first acoustic driver 221 and the second acoustic driver 222 by the control signal, so that the electrical signals have opposite phases. Further, driven by the electrical signals with opposite phases, the first acoustic driver 221 and the second acoustic driver 222 may generate sounds with opposite phases. After passing through the cavity 213 and the cavity 214 respectively, the sounds may propagate outward from the sound guiding hole 211 and the sound guiding hole 212, respectively. In some embodiments, the structures of the cavity 213 and the cavity 214 may be specially designed so that the sound output by the first acoustic driver 221 from the sound guiding hole 211 and the sound output by the second acoustic driver 222 from the sound guiding hole 212 meet a specific condition. For example, the lengths of the cavity 213 and the cavity 214 may be designed so that the sounds with opposite phases may be output from the sound guiding hole 211 and the sound guiding hole 212. In some embodiments, the controller may control the first acoustic driver 221 and the second acoustic driver 222 to simultaneously generate sounds with a same amplitude by the control signal. For example, if the first acoustic driver 221 and the second acoustic driver 222 have the same frequency response characteristic, the controller may adjust the electrical signals input into the first acoustic driver 221 and the second acoustic driver 222 by the control signal. The electrical signals may control output powers of the first acoustic driver 221 and the second acoustic driver 222, respectively, so that the two electrical signals have a same amplitude. Further, driven by the electrical signals with the same amplitude, the first acoustic driver 221 and the second acoustic driver 222 may generate sounds with a same amplitude. It should be noted that the controller is not limited to controlling the first acoustic driver 221 and the second acoustic driver 222 to generate the sounds with the same amplitude and opposite phases by the control signal. For example, in some embodiments, the controller may control the first acoustic driver 221 and the second acoustic driver 222 to generate sounds with a same amplitude and a same phase by a control signal different from the above-mentioned control signal. As another example, in some embodiments, the controller may control the first acoustic driver 221 and the second acoustic driver 222 to generate sounds with different amplitudes and different phases by a control signal different from the above-mentioned control signal. The controller may also control the amplitude and the phase of sounds generated by acoustic drivers other than the first acoustic driver 221 and the second acoustic driver 222, which may not be limited and can be adjusted according to specific requirements.

Figure 3:
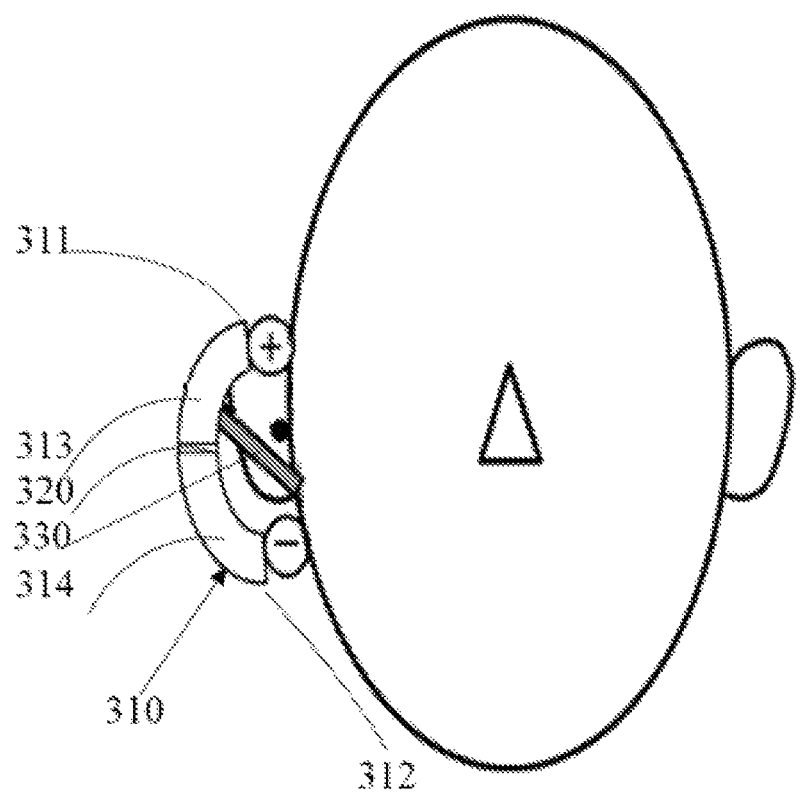
FIG. 3 is a schematic diagram illustrating an exemplary structure of an acoustic output apparatus according to some embodiments of the present disclosure.

The two sound guiding holes of the acoustic output apparatus 200 may be distributed on both sides of a user's auricle, which may increase a volume of the sound heard by the user's ear (also referred to as near-field sound) and suppress the sound leakage of the acoustic output apparatus 200 to a certain extent. In some embodiments, the two sound guiding holes of the acoustic output apparatus 200 may be divided by a baffle, which may achieve effects of increasing the near-field sound and reducing the far-field leakage. FIG. 3 is a schematic diagram illustrating an exemplary structure of an acoustic output apparatus according to some embodiments of the present disclosure. As shown in FIG. 3, the acoustic output apparatus 300 may include a supporting structure 310, an acoustic driver 320, a baffle 330, and a controller. The acoustic driver 320 and the controller may be located inside the supporting structure 310. In some embodiments, the supporting structure 310 may also be provided with a sound guiding hole 311 and a sound guiding hole 312 for transmitting sound. The sound guiding hole 311 and the sound guiding hole 312 may be located on a front side or a rear side of the user's auricle. A volume of a sound of the acoustic output apparatus 300 at any point in the space may be related to a distance from the point to the sound guiding hole 311 and the sound guiding hole 312. Merely by way of example, as shown in FIG. 3, the sound guiding hole 311 and the sound guiding hole 312 may respectively output sounds with the same amplitude and opposite phases, (represented by symbols "+" and "−", respectively). In such cases, when the distance from the point in the space to the sound guiding hole 311 is equal to the distance from the point in the space to the sound guiding hole 312, a volume of a sound at the point may be relatively small s according to the principle of interference cancellation. When the distance from the point in the space to the sound guiding hole 311 is not equal to the distance from the point in the space to the sound guiding hole 312, the greater difference between the two distances, the greater the volume of the sound at the point.

The baffle 330 may be configured to adjust acoustic distances from the sound guiding hole 311 and the sound guiding hole 312 to the user's ear (i.e., a listening position). As shown in FIG. 3, the sound guiding hole 311 and the sound guiding hole 312 may be located on both sides of the baffle 330, respectively. A count of the baffle 330 may be one or more. For example, one or more baffles 330 may be provided between the sound guiding hole 311 and the sound guiding hole 312. As another example, when the acoustic output apparatus 300 further includes sound guiding hole(s) other than the sound guiding hole 311 and the sound guiding hole 312, one or more baffles 330 may be provided between every two sound guiding holes. In some embodiments, the baffle 330 may be fixedly connected to the supporting structure 310. For example, the baffle 330 may be a part of the supporting structure 310 or integrally formed with the supporting structure 310. In other embodiments, the baffle 330 may be connected with other components (for example, an outer shell of the acoustic output apparatus 300) of the acoustic output apparatus 300.

In some embodiments, the acoustic driver 320 may include a vibration diaphragm. When the vibration diaphragm vibrates, sounds may be transmitted from the front and rear sides of the vibration diaphragm, respectively. In some embodiments, the front side of the vibration diaphragm in the supporting structure 310 may be provided with a front chamber 313 for transmitting sound. The front chamber 313 may be acoustically coupled with the sound guiding hole 311, and the sound on the front side of the vibration diaphragm may be outputted from the sound guiding hole 311 through the front chamber 313. The rear side of the vibration diaphragm in the supporting structure 310 may be provided with a rear chamber 314 for transmitting sound. The rear chamber 314 may be acoustically coupled with the sound guiding hole 312, and the sound on the rear side of the vibration diaphragm may be outputted from the sound guiding hole 112 through the rear chamber 114. It should be noted that, when the vibration diaphragm is vibrating, the front and rear sides of the vibration diaphragm may simultaneously generate sounds with opposite phases. After passing through the front chamber 313 and the rear chamber 314, respectively, the sounds may respectively propagate outward from the sound guiding hole 311 and the sound guiding hole 312. The supporting structure 310, the acoustic driver 320, the controller, the front chamber 313, and the rear chamber 314 in the acoustic output apparatus 300 may be similar to their respective corresponding components in FIG. 1, which may not be repeated herein.

It should be noted that the above descriptions are only for convenience of description, and are not intended to limit the present disclosure. It may be understood that for those skilled in the art, after understanding the principle of the present disclosure, various modifications and changes in form and details of the acoustic output apparatus may be made without departing from this principle. For example, a count of acoustic drivers in an acoustic output apparatus may not be limited to two in FIG. 2. The count of acoustic drivers may be three, four, five, etc. The supporting structure may be adjusted according to the count and distribution of the acoustic driver(s) in the acoustic output apparatus. As another example, an acoustic driver and a sound guiding hole may be acoustically coupled through a sound guiding tube. These changes are all within the protection scope of the present disclosure.

In order to further illustrate the influence of the distribution of the sound guiding holes on the user's auricle or both sides of the baffle on the sound output effect of the acoustic output apparatus, in the present disclosure, the acoustic output apparatus and the user's auricle may be equivalent to a model including two point sources and the baffle.

Just for the convenience of description and for the purpose of illustration, when sizes of the sound guiding hole on the acoustic output apparatus are small, each sound guiding hole can be approximately regarded as a point source. The sound field sound pressure p generated by a single point source may satisfy the Equation (1):

$$p = \frac{j\omega\rho_0}{4\pi r} Q_0 \exp j(\omega t - kr), \tag{1}$$

where $\omega$ denotes an angular frequency, $\rho_0$ denotes an air density, r denotes a distance between a target point and the point source, $Q_0$ denotes a volume velocity of the point source, and k denotes the wave number. The magnitude of the sound field pressure of the point source at the target point is inversely proportional to the distance from the target point to the point source.

Two sound guiding holes (for example, the sound guiding hole 111 and the sound guiding hole 112) may be set on the acoustic output apparatus. In this case, two point sources may be formed, which may reduce sound transmitted from the acoustic output apparatus to the surrounding environment (i.e., far-field sound leakage). In some embodiments, the sounds output from two sound guiding holes, that is, two point sources may have a certain phase difference. When the distance and the phase difference between the two point sources meet a certain condition, the acoustic output apparatus may output different sound effects in the near field and the far field. For example, if the phases of the two point sources corresponding to the two sound guiding holes are opposite, that is, an absolute value of the phase difference between the two point sources is 180 degrees, the far-field leakage (also referred to as far-field sound leakage) may be reduced according to the principle of reversed phase sound cancellation.

Figure 4:
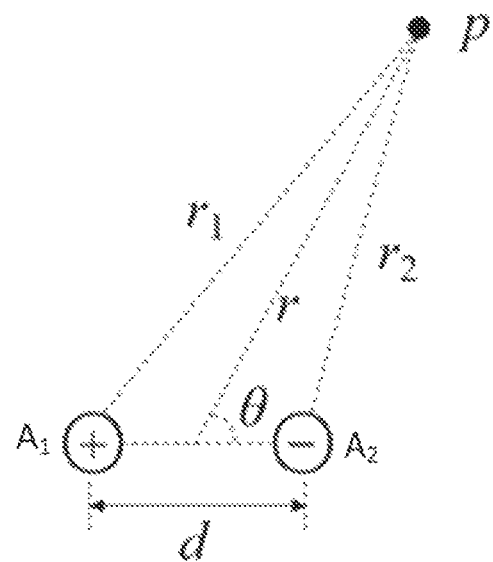
FIG. 4 is a schematic diagram illustrating two point sources according to some embodiments of the present disclosure.

As shown in FIG. 4, a sound field sound pressure p generated by two point sources may satisfy Equation (2):

$$p = \frac{A_1}{r_1} \exp j(\omega t - kr_1 + \varphi_1) + \frac{A_2}{r_2} \exp j(\omega t - kr_2 + \varphi_2), \tag{2}$$

where $A_1$ and $A_2$ denote intensities of the two point sources, $\varphi_1$ and $\varphi_2$ denote phases of the two point sources, respectively, d denotes a distance between the two point sources, and $r_1$ and $r_2$ may satisfy the Equation (3):

$$\begin{cases} r_1 = \sqrt{r^2 + \left(\frac{d}{2}\right)^2 - 2*r*\frac{d}{2}*\cos\theta} \\ r_2 = \sqrt{r^2 + \left(\frac{d}{2}\right)^2 + 2*r*\frac{d}{2}*\cos\theta} \end{cases} \quad (3)$$

where r denotes a distance between a target point and the center of the two point sources in the space, and θ indicates an angle between a line connecting the target point and the center of the two point sources and the line on which the two point source is located.

It may be concluded from Equation (3) that a magnitude of the sound pressure p of the target point in the sound field may relate to the intensity of each point source, the distance d, the phase of each point source, and the distance r.

Figure 5:
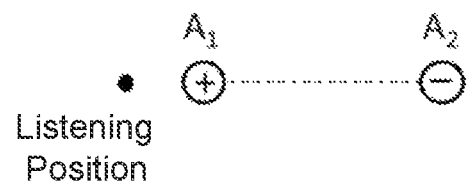
FIG. 5 is a schematic diagram illustrating two point sources and a listening position according to some embodiments of the present disclosure.
Figure 6:
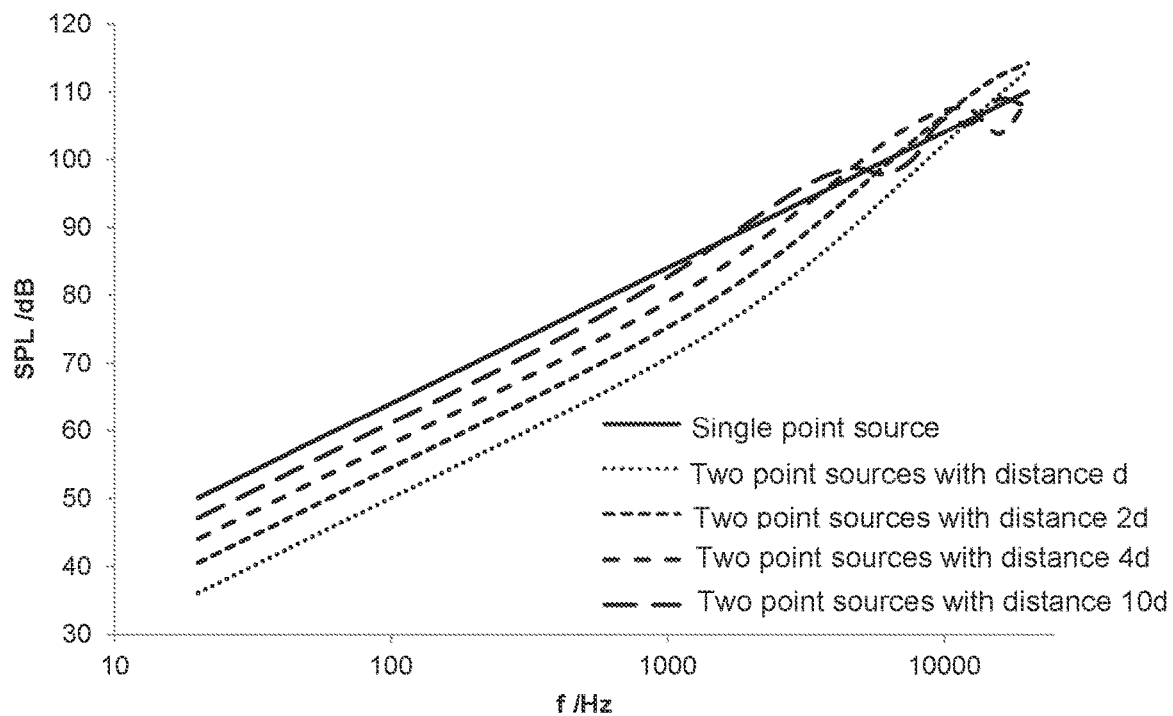
FIG. 6 is a graph illustrating frequency response curves of two point sources with different distances at a near-field listening position according to some embodiments of the present disclosure.

FIG. 5 is a schematic diagram illustrating two point sources and a listening position according to some embodiments of the present disclosure. FIG. 6 is a graph illustrating frequency response curves of two point sources with different distances at a near-field listening position according to some embodiments of the present disclosure. In some embodiments, the listening position may be taken as a target point to further illustrate a relationship between a sound pressure at the target point and the distance d between the two point sources. As used herein, the listening position may be used to indicate a position of the user's ear. The sound at the listening position may be used to represent the near-field sound generated by two point sources. It should be noted that "near-field sound" may refer to a sound within a certain range from a sound source (for example, the point source equivalent to the sound guiding hole 111), for example, a sound within 0.2 m from the sound source. Merely by way of example, as shown in FIG. 5, a point source $A_1$ and a point source $A_2$ may be on a same side of the listening position, the point source $A_1$ may be closer to the listening position, and the point source $A_1$ and the point source $A_2$ may output sounds with the same amplitude but opposite phases, respectively. As shown in FIG. 6, as the distance between the point source $A_1$ and the point source $A_2$ gradually increases (for example, from d to 10 d), the sound volume at the listening position may gradually increase. That is, as the distance between the point source $A_1$ and the point source $A_2$ increases, the difference in sound pressure amplitude (i.e., sound pressure difference) between the two sounds reaching the listening position may become larger, making the sound cancellation effect weaker, which may increase the sound volume at the listening position. However, due to the existence of sound cancellation, the sound volume at the listening position may still be less than the sound volume generated by a single point source at a same position in the low and middle frequency band (for example, a frequency of less than 1000 Hz). However, in the high-frequency band (for example, a frequency close to 10000 Hz), due to the decrease in the wavelength of the sound, mutual enhancement of the sound may appear, making the sound generated by the two point sources louder than that of the single point source. In some embodiments, a sound pressure may refer to the pressure generated by the sound through the vibration of the air.

Figure 7:
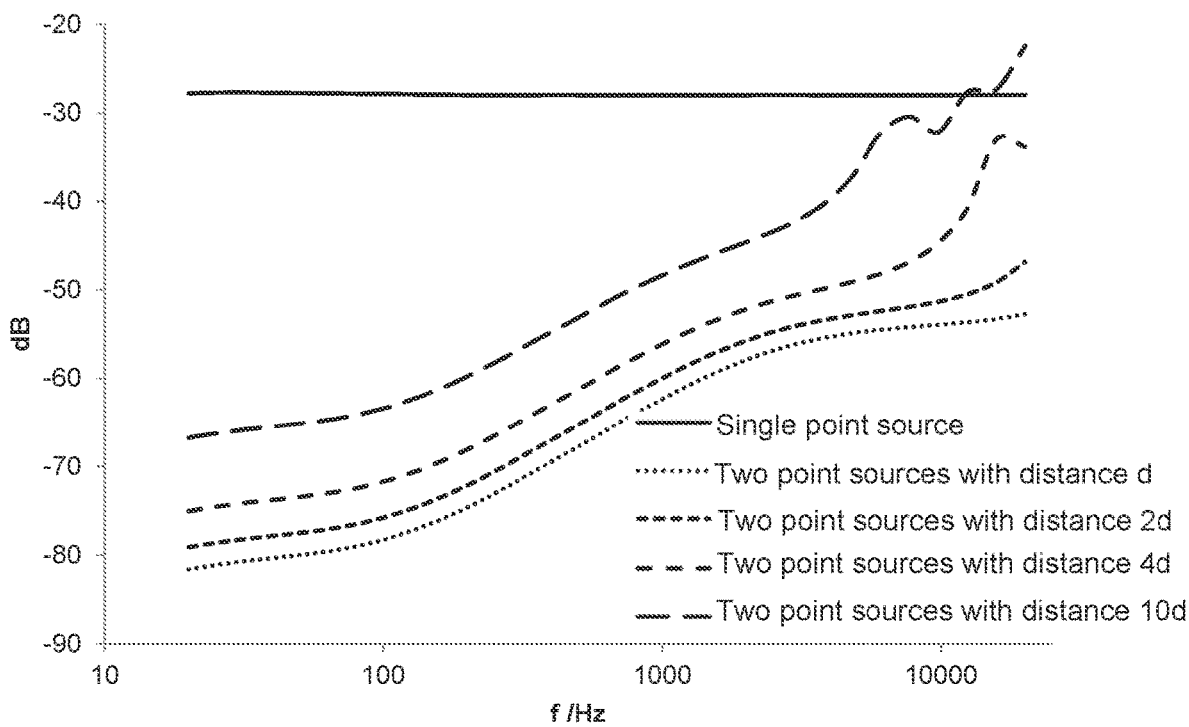
FIG. 7 is a graph illustrating sound leakage indexes of two point sources with different distances in a far field according to some embodiments of the present disclosure.

In some embodiments, by increasing the distance between the two point sources (for example, the point source $A_1$ and the point source $A_2$), the sound volume at the listening position may be increased. But as the distance increases, the sound cancellation of the two point sources may become weaker, which may lead to an increase of the far-field sound leakage. For illustration purposes, FIG. 7 is a graph illustrating sound leakage indexes (also referred to as normalization parameters) of two point sources with different distances in a far field according to some embodiments of the present disclosure. As shown in FIG. 7, a far-field sound leakage index of a single point source may be taken as a reference, as the distance between two point sources increases from d to 10 d, the far-field sound leakage index may gradually increase, which indicates that the sound leakage becomes larger. More descriptions regarding the sound leakage index may be found in equation (4) and related descriptions.

Figure 8:
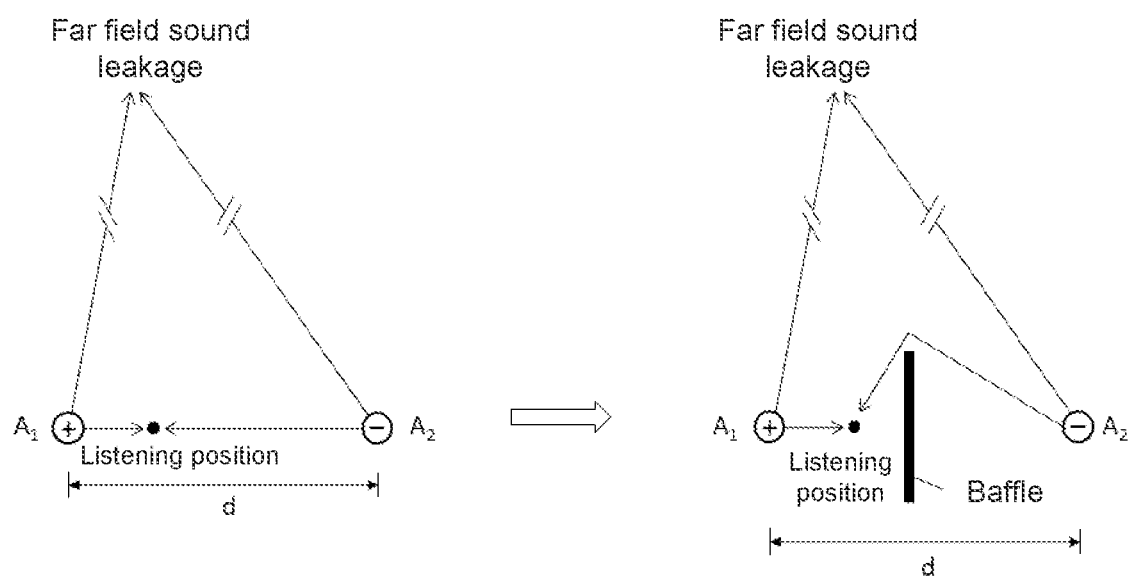
FIG. 8 is a schematic diagram illustrating an exemplary baffle provided between two point sources according to some embodiments of the present disclosure.

In some embodiments, adding a baffle structure to the acoustic output apparatus may be beneficial to improve the output effect of the acoustic output apparatus, that is, to increase the sound intensity at the near-field listening position, while reducing the volume of the far-field sound leakage. For illustration, FIG. 8 is a schematic diagram illustrating an exemplary baffle provided between two point sources according to some embodiments of the present disclosure. As shown in FIG. 8, when a baffle is provided between the point source $A_1$ and the point source $A_2$, in the near field, the sound wave of the point source $A_2$ may need to bypass the baffle to interfere with the sound wave of the point source $A_1$ at the listening position, which may be equivalent to increasing the length of the acoustic route from the point source $A_2$ to the listening position. Therefore, assuming that the point source $A_1$ and the point source $A_2$ have a same amplitude, compared to the case without a baffle, the difference in the amplitude of the sound waves of the point source $A_1$ and the point source $A_2$ at the listening position may increase, so that the degree of cancellation of the two sounds at the listening position may decrease, causing the sound volume at the listening position to increase. In the far field, because the sound waves generated by the point source $A_1$ and the point source $A_2$ do not need to bypass the baffle in a large space, the sound waves may interfere (similar to the case without a baffle). Compared to the case without a baffle, the sound leakage in the far field may not increase significantly. Therefore, a baffle structure being provided between the point source $A_1$ and the point source $A_2$ may increase the sound volume at the near-field listening position significantly while the volume of the far-field leakage does not increase significantly.

Figure 9:
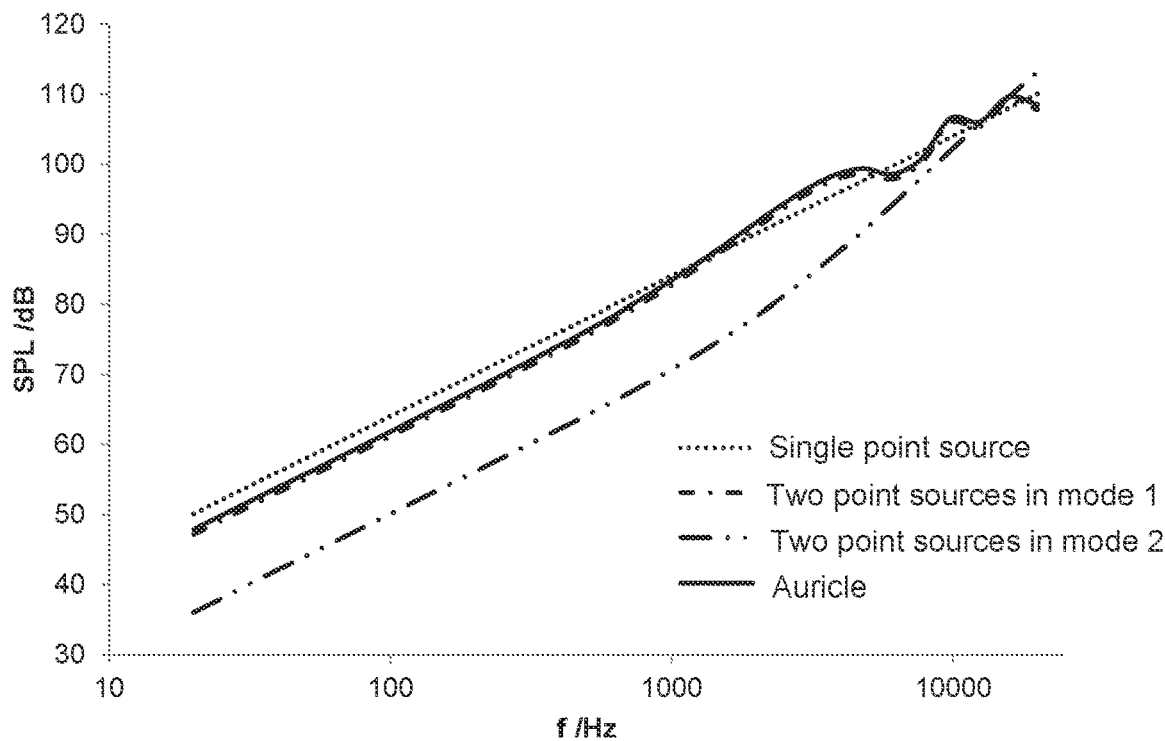
FIG. 9 is a graph illustrating frequency response curves of two point sources in a near field when an auricle is located between the two point sources according to some embodiments of the present disclosure.
Figure 10:
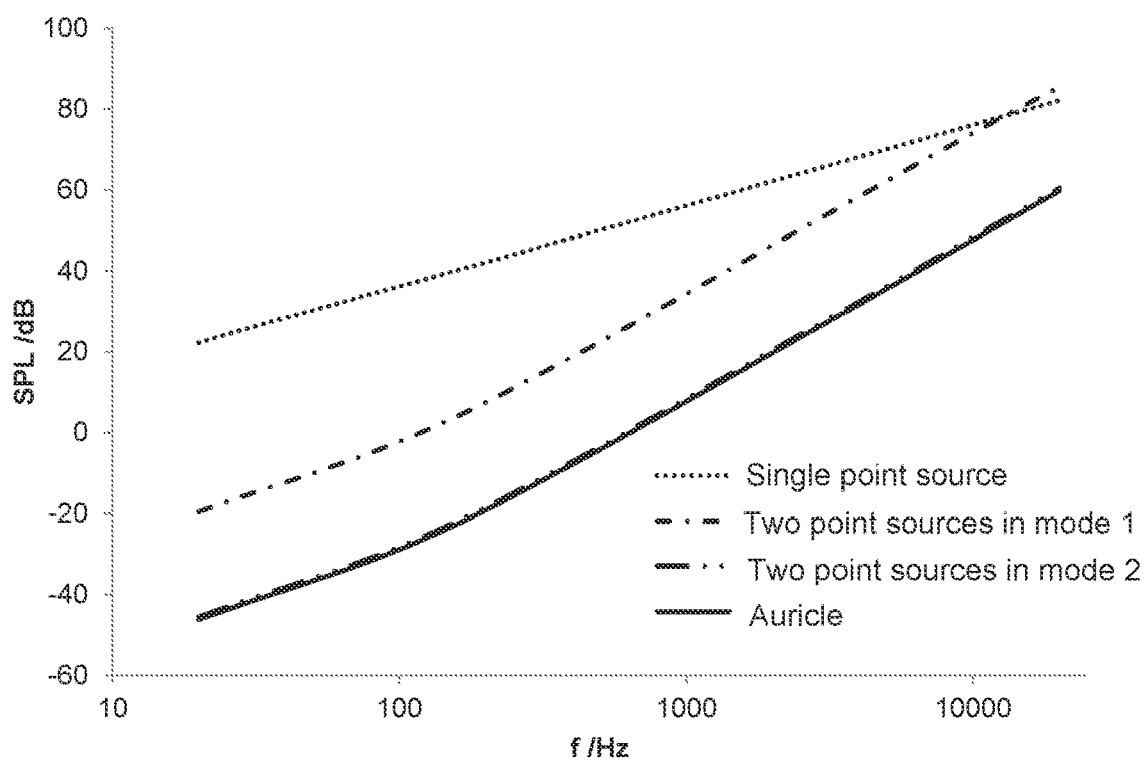
FIG. 10 is a graph illustrating frequency response curves of two point sources in a far field when an auricle is located between the two point sources according to some embodiments of the present disclosure.

FIG. 9 is a graph illustrating frequency response curves of two point sources in a near field when an auricle is located between the two point sources according to some embodiments of the present disclosure. FIG. 10 is a graph illustrating frequency response curves of two point sources in a far field when an auricle is located between the two point sources according to some embodiments of the present disclosure. In the present disclosure, when the two point sources are located on both sides of the auricle, the auricle may serve as a baffle, so the auricle may also be referred to as a baffle for convenience. As an example, due to the existence of the auricle, the result may be equivalent to that the near-field sound may be generated by two point sources with a distance of $D_1$ (also known as mode 1). The far-field sound may be generated by two point sources with a distance of $D_2$ (also known as mode 2), $D_1 > D_2$. As shown in FIG. 9, in a low-frequency range (e.g., when the frequency is less than 1000 Hz), when the two point sources are distributed on both sides of the auricle, the volume at the near-field sound (i.e., the sound heard by the user's ear) may basically be the same as that of the near-field sound in mode 1, be greater than the volume of the near-field sound in mode 2 and be close to the volume of the near-field sound of a single point source. As the frequency increases (e.g., when the frequency is between 2000 Hz-7000 Hz), the volume of the near-field sound in mode 1 and the two point sources being distributed on both sides of the auricle may be greater than that of the single point source. It shows that when the user's auricle is located between the two point sources, the volume of the near-field sound transmitted from the sound source to the user's ear may be effectively enhanced. As shown in FIG. 10, as the frequency increases, the volume of the far-field leakage may increase, but when the two point sources are distributed on both sides of the auricle, the volume of the far-field leakage generated by the two point sources may be basically the same as that of the volume of the far-field leakage in mode 2, and both of which may be less than the volume of the far-field leakage in mode 1 and the volume of the far-field leakage of a single point source. It shows that when the user's auricle is located between the two point sources, the sound transmitted from the sound source to the far field may be effectively reduced, that is, the sound leakage from the sound source to the surrounding environment may be effectively reduced.

More descriptions regarding the specific meaning and related content of the sound leakage index may refer to the following description. In the application of the open acoustic output apparatus, it may be necessary to ensure that a sound pressure Pear at the listening position is large enough to meet the listening needs. Meanwhile, it may be necessary to ensure that a sound pressure $P_{far}$ at the far field is small enough to reduce sound leakage. Therefore, the sound leakage index a may be used as an index to evaluate the ability to reduce the sound leakage.

$$\alpha = \frac{|P_{far}|^2}{|P_{ear}|^2}. \tag{4}$$

Figure 11:
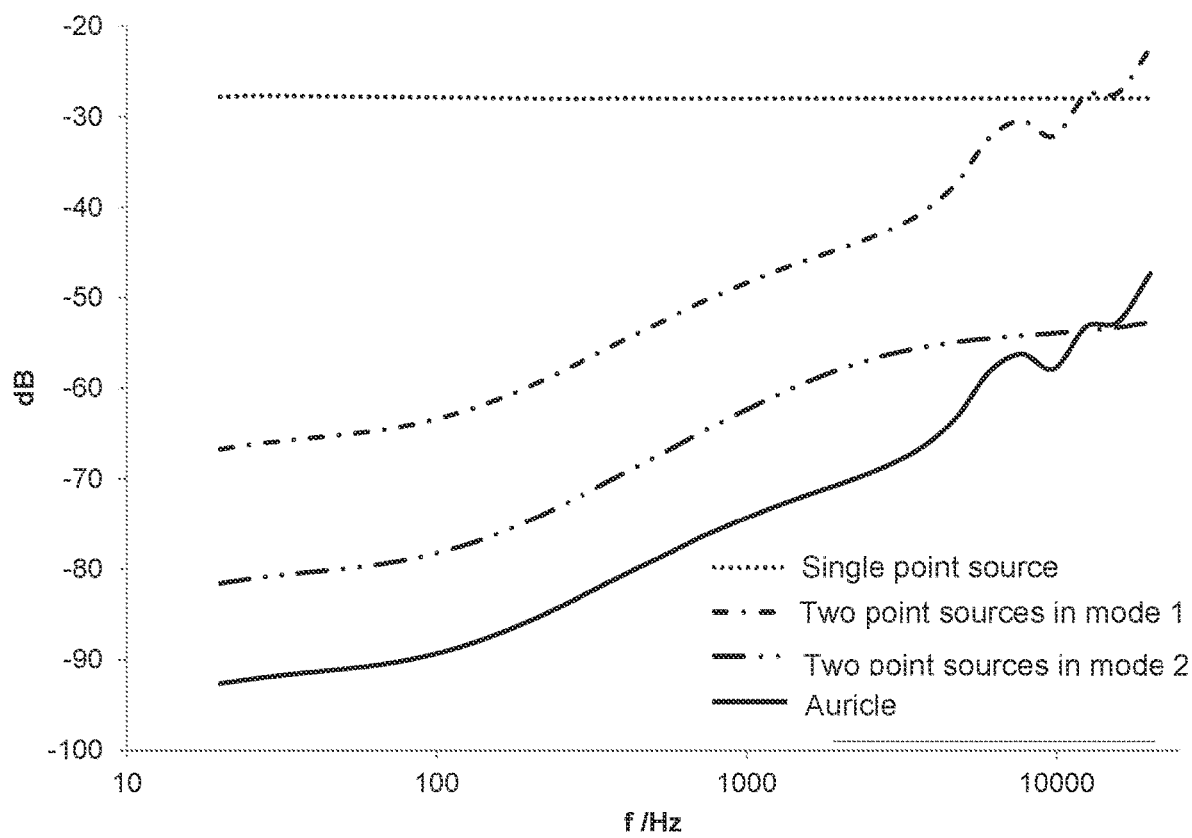
FIG. 11 is a graph illustrating sound leakage indexes of two point sources when two point sources of an acoustic output apparatus are distributed on both sides of an auricle according to some embodiments of the present disclosure.

It may be concluded from Equation (4) that, the smaller the sound leakage index is, the stronger the ability of the acoustic output apparatus to reduce the sound leakage may be. When the volume of the near-field sound at the listening position remains unchanged, the smaller the sound leakage index is, the smaller the far-field sound leakage may be. As shown in FIG. 11, when the frequency is less than 10000 Hz, the leakage index of the two point sources being distributed on both sides of the auricle may be less than the leakage index in the case of mode 1 (no baffle structure between the two point sources, and the distance is $D_1$), Mode 2 (no baffle structure between the two point sources, and the distance is $D_2$) and the single point source, which may also show that when the two point sources are located on both sides of the auricle, the acoustic output apparatus may have a better capability to reduce the sound leakage.

Figure 12:
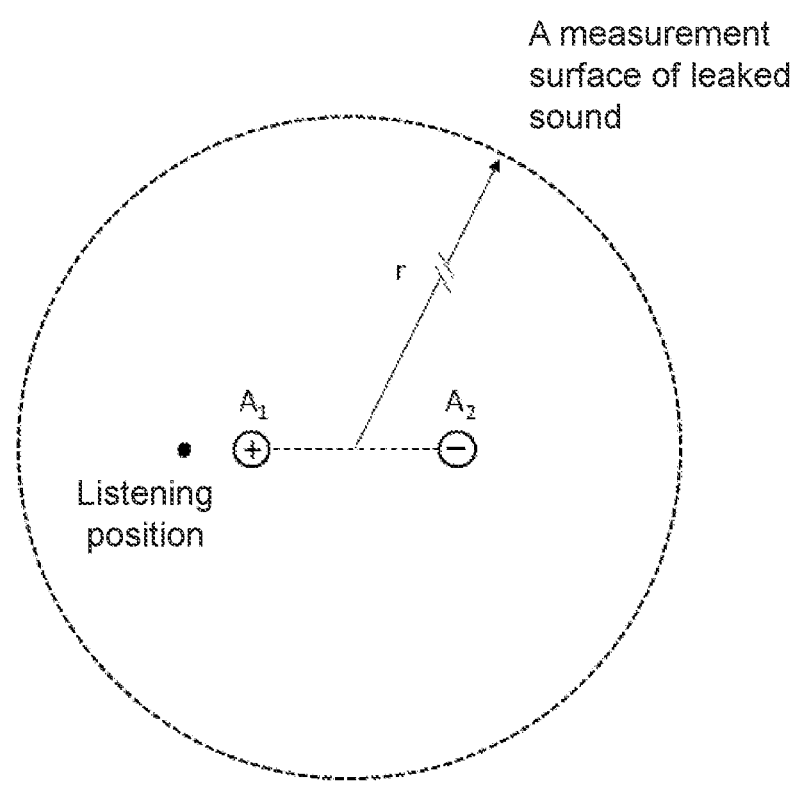
FIG. 12 is a schematic diagram illustrating exemplary measurement manner of sound leakage according to some embodiments of the present disclosure.

FIG. 12 is a schematic diagram illustrating exemplary measurement manner of sound leakage according to some embodiments of the present disclosure. As shown in FIG. 12, a listening position may be located on a left side of a point source $A_1$. A measurement manner of the leakage sound may be that a plurality of points on a spherical surface centered by a center point of the two point sources (for example, $A_1$ and $A_2$ in FIG. 7) with a radius of r may be identified, and an average value of amplitudes of the sound pressure at the plurality of points may be determined as a value of the sound leakage. It should be noted that the measurement manner of the leakage sound may merely serve as an exemplary illustration, which may be not limited. The manner for measuring and determining the sound leakage may be adjusted according to the actual conditions. For example, one or more points in the far field may be taken as the position for measuring the sound leakage. As another example, a center of the two point sources may be used as a center of a circle at the far field, and sound pressure amplitudes of two or more points evenly distributed at the circle according to a certain spatial angle may be averaged as the value of the sound leakage. In some embodiments, a measurement manner of the sound heard by the user may be that a location point near the point source may be identified as a listening position, and an amplitude of the sound pressure measured at the listening position may be determined as a volume of the sound heard by the user. In some embodiments, the listening position may be on the connection line between two point sources or not on the connection line between two point sources. The manner for measuring and determining the volume of the sound heard by the user may be adjusted according to the actual conditions. For example, the sound pressure amplitudes of other points or one or more points in the near field may be averaged as the volume of the sound heard by the user. As another example, a certain point source may be used as a center of a circle at the near field, and the sound pressure amplitudes of two or more points evenly distributed at the circle according to a certain spatial angle may be averaged as the volume of the sound heard by the user. In some embodiments, a distance between the near-field listening position and a point source may be far less than a distance between the point source and the spherical surface for measuring the far-field sound leakage.

It should be noted that the sound guiding holes for outputting sound as point sources may merely serve as an illustration of the principle and effect in the present disclosure, and may not limit the shapes and sizes of the sound guiding holes in practical applications. In some embodiments, if an area of a sound guiding hole is large, the sound guiding hole may also be equivalent to a surface source radiating sound outward. In some embodiments, the point source may also be realized by other structures, such as a vibration surface, a sound radiation surface, etc. For those skilled in the art, without creative activities, it may be known that the sound generated by structures such as a sound guiding hole, a vibration surface, a sound radiation surface, or the like may be equivalent to a point source at the spatial scale discussed in the present disclosure, and may have the same sound propagation characteristics and the same mathematical description. Further, for those skilled in the art, without creative activities, it may be known that the acoustic effect achieved by "an acoustic driver may outputting sound from at least two first sound guiding holes" described in the present disclosure may also achieve the same effect by other acoustic structures, for example, "at least two acoustic drivers each may output sound from at least one sound radiation surface". According to actual conditions, other acoustic structures may be selected for adjustment and combination, and the same acoustic output effect may also be achieved. The principle of radiating sound outward with structures such as surface sources may be similar to that of point sources, which may not be repeated here. Further, a count of sound guiding holes (point source or surface source) on the acoustic output apparatus may not be limited to two, which may be three, four, five, etc., thereby forming a plurality of sets of two point/surface sources or a set of multi-point/surface sources, which may not be limited herein and may achieve the technical effects that can be achieved by the two point sources in the present disclosure.

In order to further explain the effect on the sound output effect with or without a baffle between the two point sources or the two sound guiding holes, the volume of the near-field sound at the listening position or/and the volume of the far-field leakage under different conditions may be specifically described below.

Figure 13:
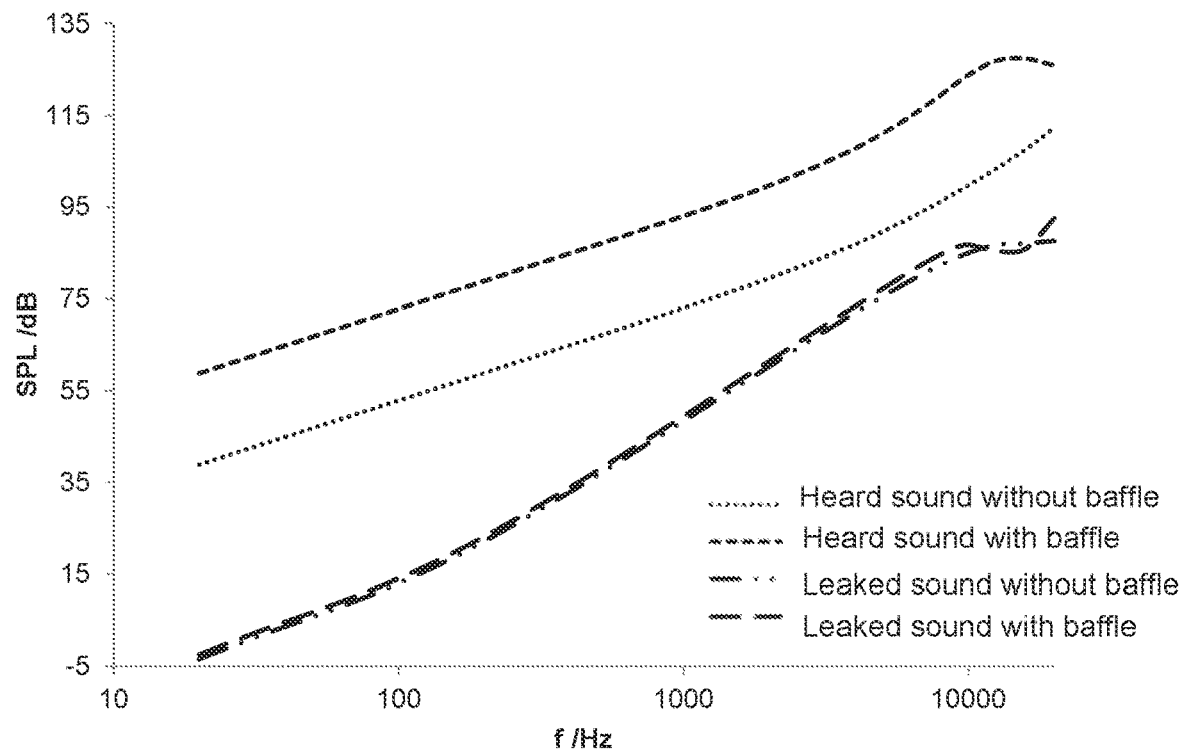
FIG. 13 is a graph illustrating frequency response curves of two point sources with and without a baffle between two point sources according to some embodiments of the present disclosure.

FIG. 13 is a graph illustrating frequency response curves of two point sources with and without a baffle between two point sources according to some embodiments of the present disclosure. As shown in FIG. 13, after adding a baffle between the two point sources (that is, two sound guiding holes) of the acoustic output apparatus, in the near field, it may be equivalent to increasing the distance between the two point sources, and the volume at the near-field listening position may be equivalent to being generated by a set of two point sources with a larger distance. The volume of the near-field sound may be significantly increased compared to the case without a baffle. In the far field, since the interference of the sound waves generated by the two point sources is rarely affected by the baffle, the sound leakage may not change significantly with or without the baffle. It may be seen that by setting a baffle between the two sound guiding holes (two point sources), the capability to reduce sound leakage of the acoustic output apparatus may be effectively improved, the volume of the near-field sound of the acoustic output apparatus may be significantly increased. Therefore, the requirements for sound generation components of the acoustic output apparatus may be greatly reduced, which may reduce the electrical loss of the acoustic output apparatus at the same time due to simple circuit structure, so that the working time of the acoustic output apparatus may be greatly prolonged under a certain amount of electricity.

Figure 14:
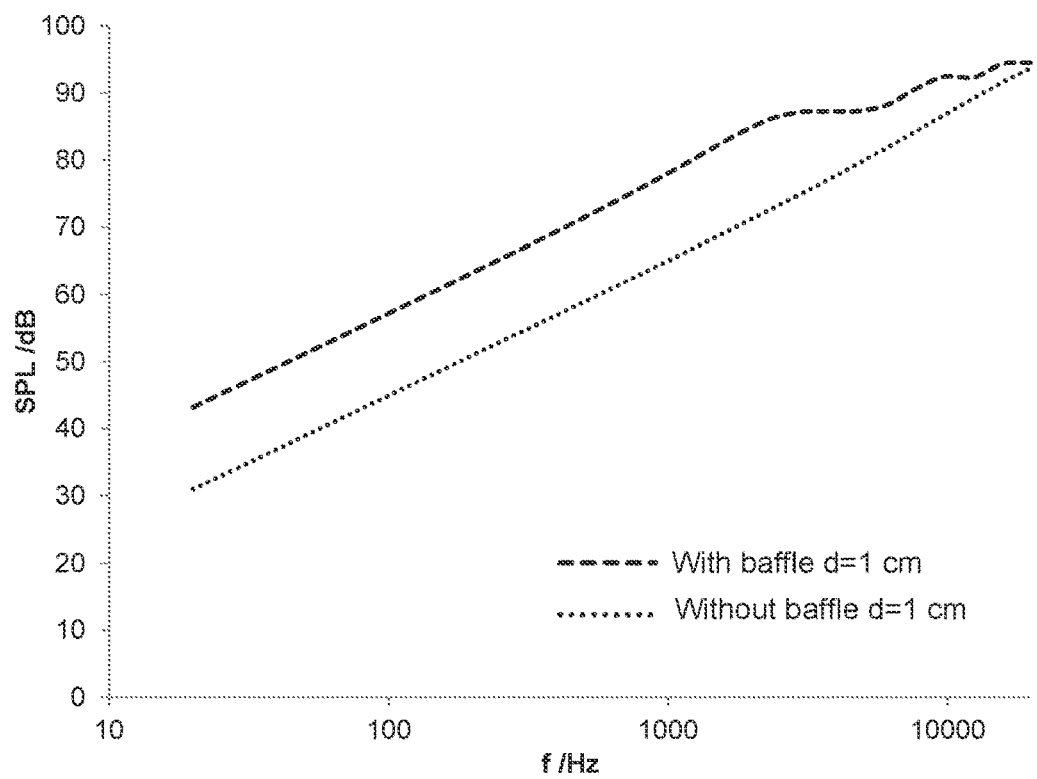
FIG. 14 is a graph illustrating frequency response curves of two point sources in a near field when a distance d between the two point sources is 1 cm according to some embodiments of the present disclosure.
Figure 15:
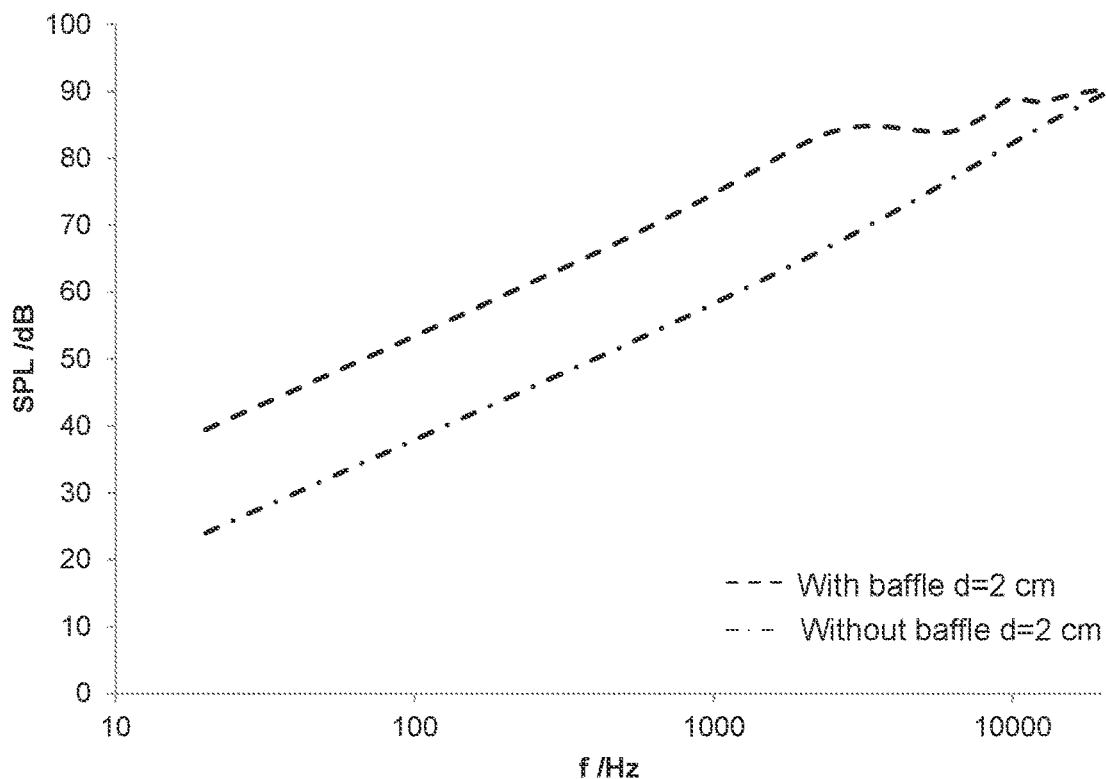
FIG. 15 is a graph illustrating frequency response curves of two point sources in a near field when a distance d between the two point sources is 2 cm according to some embodiments of the present disclosure.
Figure 16:
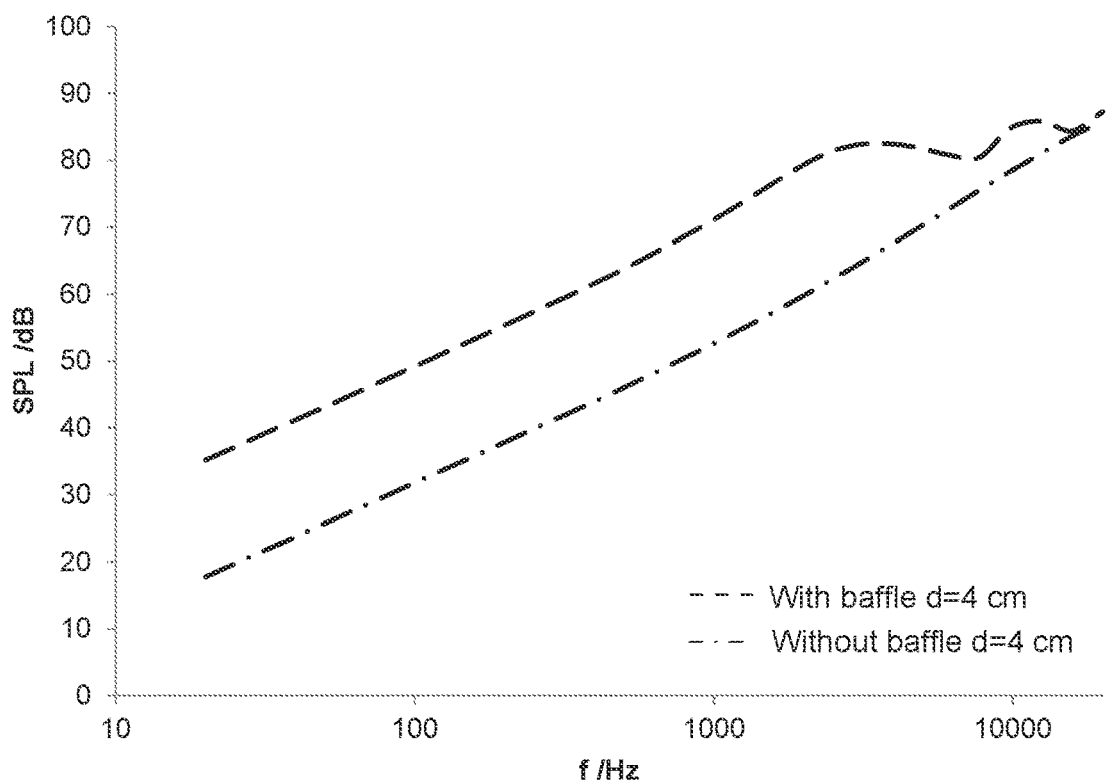
FIG. 16 is a graph illustrating frequency response curves of two point sources in a near field when a distance d between the two point sources is 4 cm according to some embodiments of the present disclosure.
Figure 17:
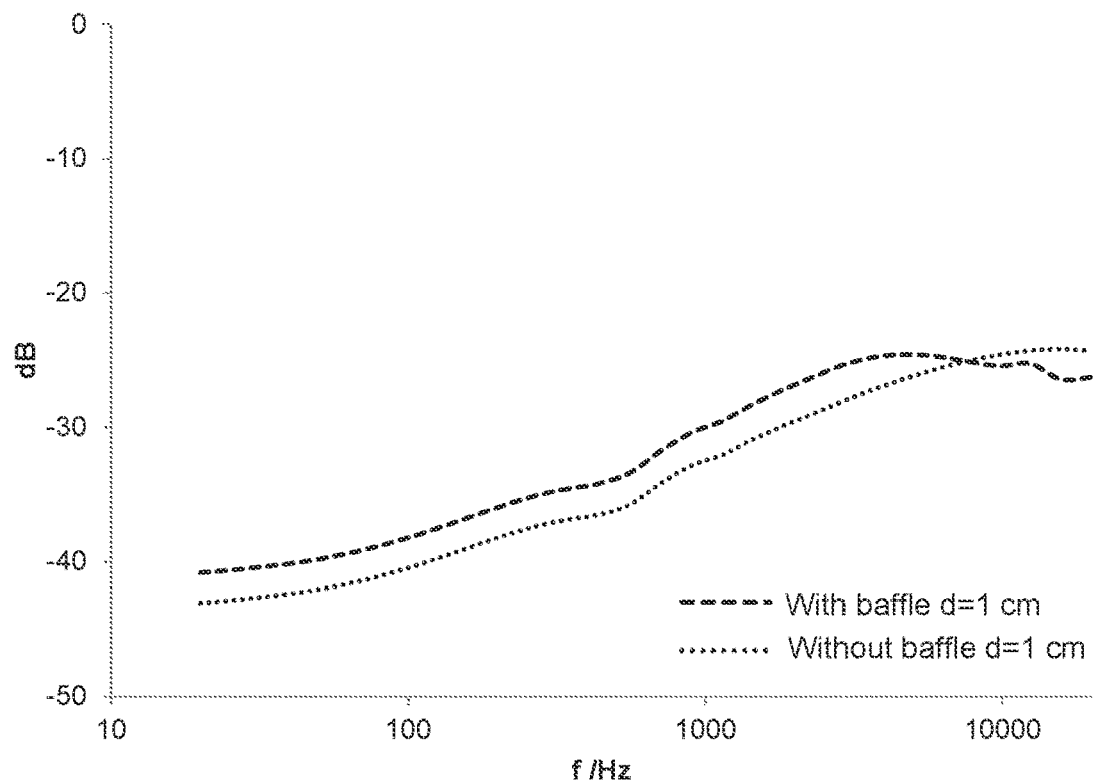
FIG. 17 is a graph illustrating sound leakage indexes of two point sources in a far field when a distance d between the two point sources is 1 cm according to some embodiments of the present disclosure.
Figure 18:
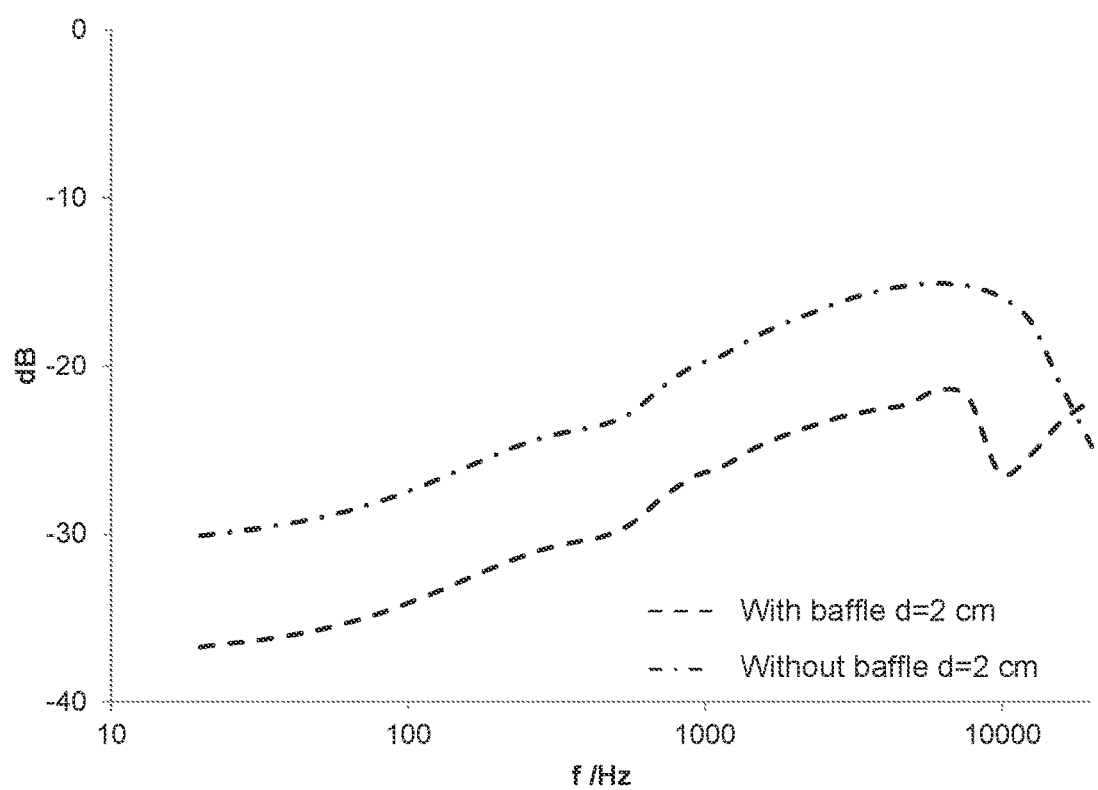
FIG. 18 is a graph illustrating sound leakage indexes of two point sources in a far field when a distance d between the two point sources is 2 cm according to some embodiments of the present disclosure.
Figure 19:
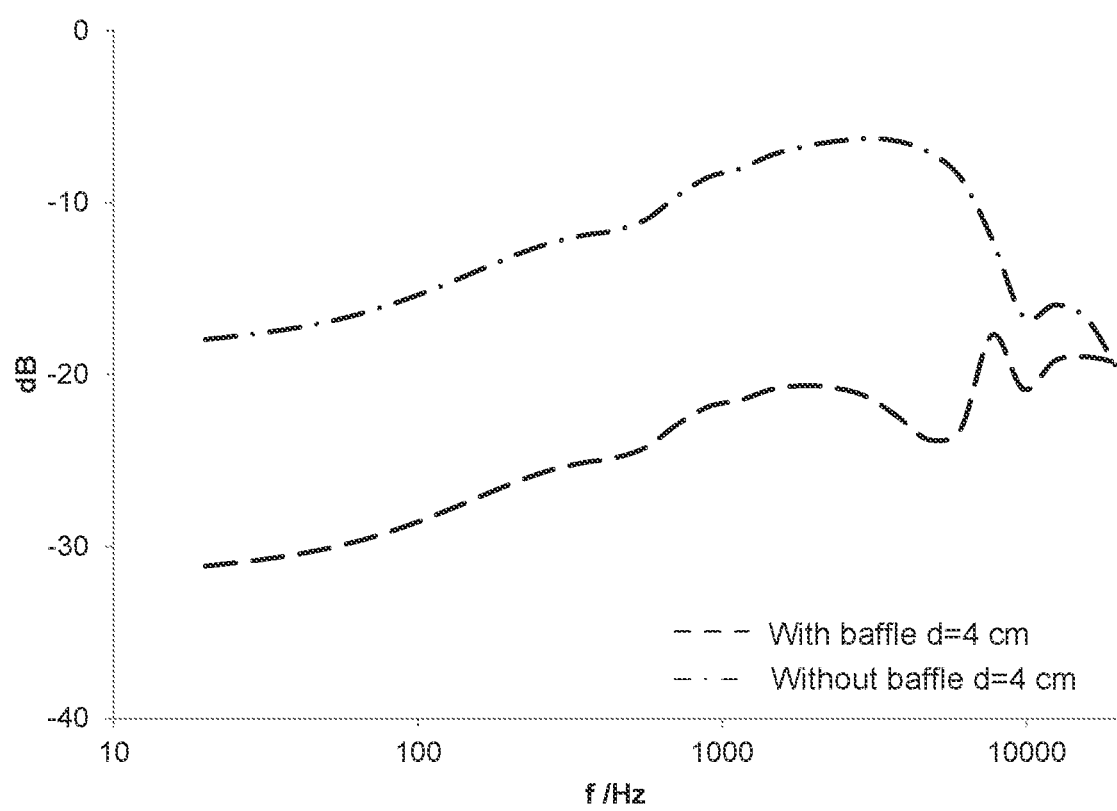
FIG. 19 is a graph illustrating sound leakage indexes of two point sources in a far field when a distance d between the two point sources is 4 cm according to some embodiments of the present disclosure.

FIG. 14 is a graph illustrating frequency response curves of two point sources in a near field when a distance d between the two point sources is 1 cm according to some embodiments of the present disclosure. FIG. 15 is a graph illustrating frequency response curves of two point sources in a near field when a distance d between the two point sources is 2 cm according to some embodiments of the present disclosure. FIG. 16 is a graph illustrating frequency response curves of two point sources in a near field when a distance d between the two point sources is 4 cm according to some embodiments of the present disclosure. FIG. 17 is a graph illustrating sound leakage indexes of two point sources in a far field when a distance d between the two point sources is 1 cm according to some embodiments of the present disclosure. FIG. 18 is a graph illustrating sound leakage indexes of two point sources in a far field when a distance d between the two point sources is 2 cm according to some embodiments of the present disclosure. FIG. 19 is a graph illustrating sound leakage indexes of two point sources in a far field when a distance d between the two point sources is 4 cm according to some embodiments of the present disclosure. As shown in FIGS. 14-16, for the different distances d (e.g., 1 cm, 2 cm, 4 cm) of different sound guiding holes, at a certain frequency, in the near-field listening position (e.g., the user's ears), the sound volume of two sound guiding holes located on both sides of the auricle, (i.e., the "baffle function" situation shown in the figure) may be greater than the sound volume of two sound guiding holes located on a same side of the auricle (i.e., the case of "without baffle" as shown in the figure). The certain frequency mentioned here may be below 10000 Hz, or preferably, below 5000 Hz, or more preferably, below 1000 Hz.

As shown in FIGS. 17-19, for the different distanced (for example, 1 cm, 2 cm, 4 cm) of the sound guiding holes, at a certain frequency, in the far-field position (e.g., the environmental position far away from the user's ears), the volume of the leakage sound generated when the two sound guiding holes are located on both sides of the auricle may be smaller than that generated when the two sound guiding holes are not located on both sides of the auricle. It should be noted that as the distance between two sound guiding holes or two point sources increases, the interference cancellation of sound at the far-field position may be weakened, leading to a gradual increase in the far-field leakage and a weaker ability to reduce sound leakage. Therefore, the distance d between two sound guiding holes or the two point sources may not be too large. In some embodiments, in order to keep the sound output device output sound as loud as possible in the near field and suppress the sound leakage in the far field, the distance d between the two sound guiding holes may be set to no more than 20 cm. Preferably, the distance d between the two sound guiding holes may be no more than 12 cm. More preferably, the distance d between the two sound guiding holes may be no more than 10 cm. More preferably, the distance d between the two sound guiding holes may be no more than 8 cm. More preferably, the distance d between the two sound guiding holes may be no more than 6 cm. More preferably, the distance d between the two sound guiding holes may be no more than 3 cm.

Figure 20:
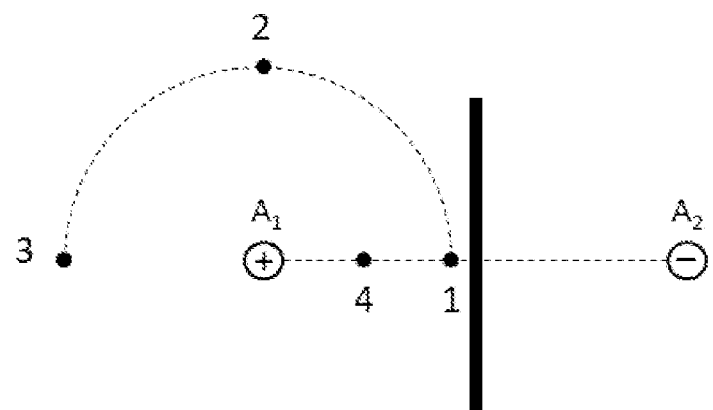
FIG. 20 is a graph illustrating exemplary distributions of different listening positions according to some embodiments of the present disclosure.

In some embodiments, on the premise of maintaining the distance between the two point sources, a relative position of the listening position to the two point sources may have a certain effect on the volume of the near-field sound and the far-field leakage reduction. In order to improve the acoustic output effect of the acoustic output apparatus, in some embodiments, the acoustic output apparatus may be provided with at least two sound guiding holes, the at least two sound guiding holes may include two sound guiding holes located on the front and rear sides of the user's auricle, respectively. In some specific embodiments, considering that the sound propagated from the sound guiding hole located on the rear side of the user's auricle needs to bypass over the auricle to reach the user's ear canal, the acoustic route between the sound guiding hole located on the front side of the auricle and the user's ear canal (i.e., the acoustic distance from the sound guiding hole to the of the entrance) may be shorter than the acoustic route between the sound guiding hole located on the rear side of the auricle from the user's ear. In some embodiments, the acoustic output apparatus may include two sound guiding holes. The two sound guiding holes may be respectively located on both sides of the listening position, and the baffle may be located at one side of the listening position. The distance from one sound guiding hole on a same side of the baffle as the listening position of the two sound guiding holes to the listening position may be shorter than the distance from the other sound guiding hole to the listening position. In order to further illustrate the effect of the listening position on the sound output effect, as an exemplary illustration, as shown in FIG. 20, four representative listening positions (a listening position 1, a listening position 2, a listening position 3, a listening position 4) may be selected to illustrate the effect and principle of listening position selection. The listening position 1, the listening position 2, and the listening position 3 may have an equal distance from the point source $A_1$, which may be $r_1$. The distance between the listening position 4 and the point source $A_1$ may be $r_2$, and $r_2 < r_1$. The point source $A_1$ and the point source $A_2$ may generate sounds with opposite phases, respectively.

Figure 21:
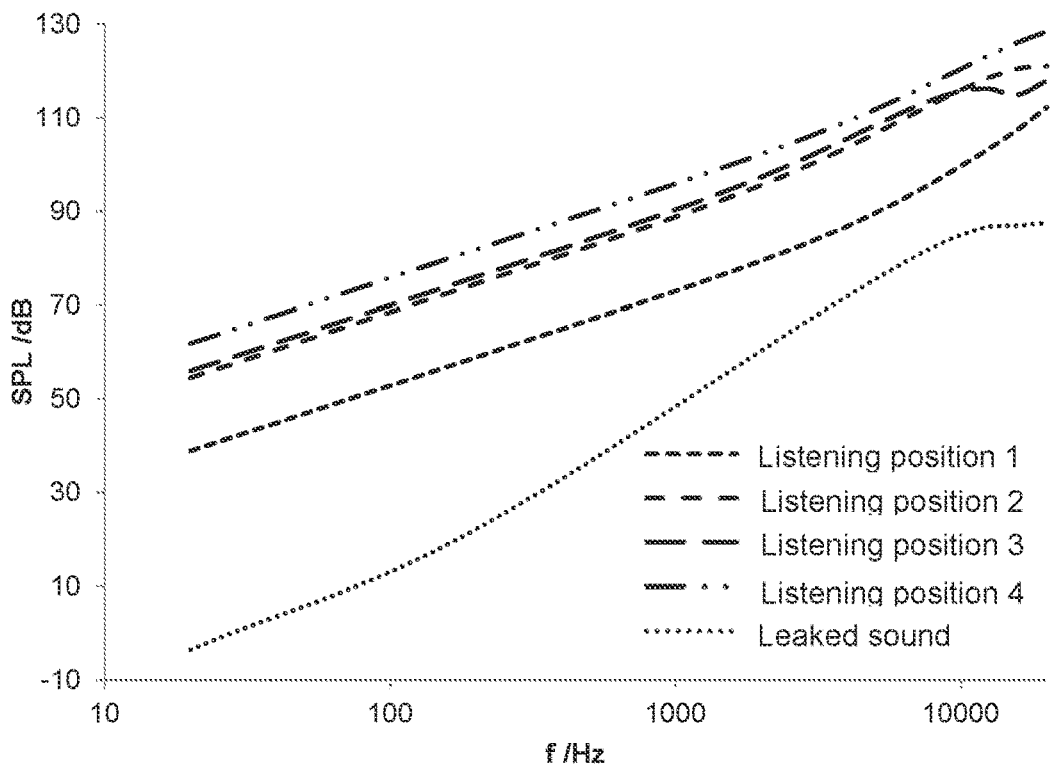
FIG. 21 is a graph illustrating frequency response curves of two point sources without a baffle at different listening positions in a near field according to some embodiments of the present disclosure.
Figure 22:
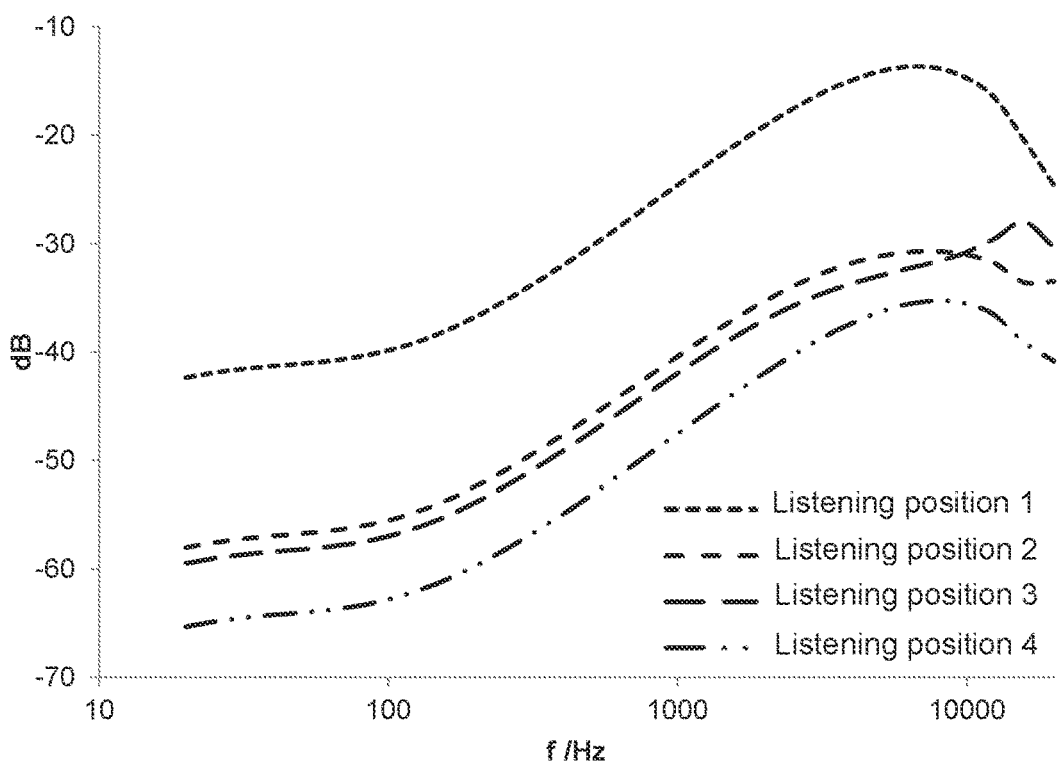
FIG. 22 is a graph illustrating sound leakage indexes of two point sources without a baffle at different listening positions according to some embodiments of the present disclosure.

FIG. 21 is a graph illustrating frequency response curves of two point sources without a baffle at different listening positions in a near field according to some embodiments of the present disclosure. FIG. 22 is a graph illustrating sound leakage indexes at different listening positions obtained based on Equation (4) on the basis of FIG. 21. As shown in FIGS. 21 and 22, for the listening position 1, since the acoustic route difference between the point source $A_1$ and the point source $A_2$ to the listening position 1 is small, the difference in amplitude of the sound generated by the two point sources at the listening position 1 may be small, so that interference of the sounds of two point sources at the listening position 1 may cause the volume of the sound heard by the user to be smaller than that of other listening positions. For the listening position 2, compared with the listening position 1, the distance between the listening position 2 and the point source $A_1$ may remain unchanged, that is, the acoustic route from the point source $A_1$ to the listening position 2 may not change. However, the distance between the listening position 2 and the point source $A_2$ may be longer, and the acoustic route between the point source $A_2$ and the listening position 2 may increase. The amplitude difference between the sound generated by the point source $A_1$ and the point source $A_2$ at the listening position 2 may increase, so the volume of the sound transmitted from the two point sources after interference at listening position 2 may be greater than that at the listening position 1. Among all positions on an arc with a radius of $r_1$, since the acoustic route difference between the point source $A_1$ and the point source $A_2$ to the listening position 3 may be the longest, compared with the listening position 1 and the listening position 2, the listening position 3 may have the highest volume of the sound heard by the user. For the listening position 4, the distance between the listening position 4 and the point source $A_1$ may be short. The sound amplitude of the point source $A_1$ at the listening position 4 may be relatively large, the volume of the sound heard by the user at the listening position 4 may be relatively large. In summary, the volume of the sound heard by the user at the near-field listening position may change with the listening position and the relative position of the two point sources. When the listening position is on the connection line between two point sources and on the same side of the two point sources (for example, listening position 3), the acoustic route difference between the two point sources at the listening position may be the largest (the acoustic route difference may be the distance d between the two point sources). In this case (i.e., when the auricle is not used as a baffle), the volume of the sound heard by the user at this listening position may be greater than that at other positions. According to Equation (4), when the far-field sound leakage is constant, the sound leakage index corresponding to the listening position may be the smallest, and the leakage reduction capability may be the strongest. At the same time, reducing the distance $r_1$ between the listening position (for example, listening position 4) and the point source $A_1$ may further increase the volume at the listening position, reduce the sound leakage index, and improve the capability to reduce leakage.

Figure 23:
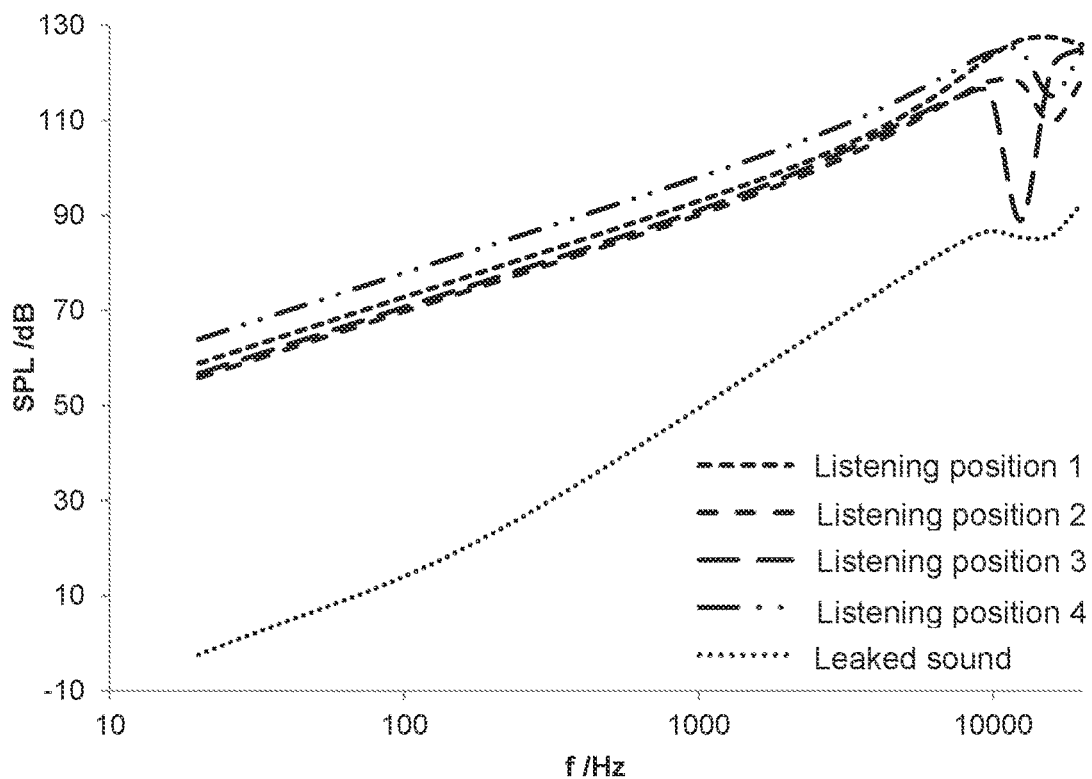
FIG. 23 is a graph illustrating frequency response curves of two point sources with a baffle at different listening positions in a near field according to some embodiments of the present disclosure.
Figure 24:
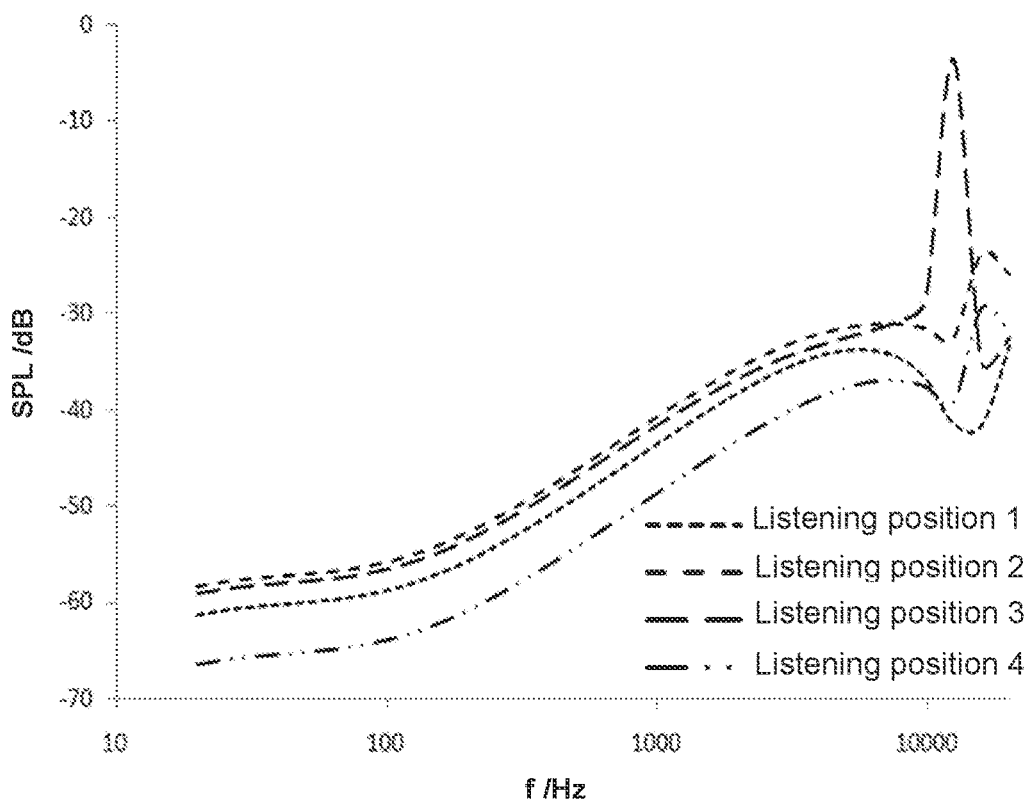
FIG. 24 is a graph illustrating sound leakage indexes of two point sources with a baffle at different listening positions according to some embodiments of the present disclosure.

FIG. 23 is a graph illustrating frequency response curves of two point sources with a baffle (as shown in FIG. 20) at different listening positions in a near field according to some embodiments of the present disclosure. FIG. 24 is a graph illustrating=sound leakage indexes at different listening positions obtained based on Equation (4) on the basis of FIG. 23. As shown in FIGS. 22 and 23, compared to the case without a baffle, the volume of the sound generated by the two point sources at listening position 1 may increase significantly when there is a baffle, the volume of the sound heard by the user at the listening position 1 may exceed that at the listening position 2 and the listening position 3. The reason may be that the acoustic route from the point source $A_2$ to the listening position 1 may increase after a baffle is set between the two point sources. As a result, the acoustic route difference from the two point sources to the listening position 1 may increase significantly. The amplitude difference between the sounds generated by the two point sources at the listening position 1 may increase, which reduces the interference and cancellation of sounds, thereby increasing the volume of the sound heard by the user generated at the listening position 1 significantly. At the listening position 4, since the distance between the listening position and the point source $A_1$ is further reduced, the sound amplitude of the point source $A_1$ at this position may be larger. The volume of the sound heard by the user at the listening position 4 may still be the largest among the four listening positions. For listening position 2 and listening position 3, since the increased effect of the baffle on the acoustic route from the point source $A_2$ to the two listening positions is not very obvious, the volume increase effect at the listening position 2 and the listening position 3 may be less than that at the listening position 1 and the listening position 4 which are closer to the baffle.

The volume of the leaked sound in the far field may not change with listening positions, and the volume of the sound heard by the user at the listening position in the near field may change with listening positions. In this case, according to Equation (4), the leakage index of the acoustic output apparatus may vary in different listening positions. A listening position with a large volume of the sound heard by the user (for example, listening position 1 and listening position 4) may have a small sound leakage index, and a strong capability to reduce leakage. A listening position with a low volume of the sound heard by the user (for example, listening position 2 and listening position 3), may have a large sound leakage index, and a weak capability to reduce leakage.

Therefore, according to the actual application scenario of the acoustic output apparatus, the user's auricle may serve as a baffle. In this case, the two sound guiding holes on the acoustic output apparatus may be arranged on the front side and the rear side of the auricle, respectively, and the ear canal may be located between the two sound guiding holes as a listening position. In some embodiments, by designing the positions of the two sound guiding holes on the acoustic output apparatus, the distance between the sound guiding hole on the front side of the auricle and the ear canal may be smaller than the distance between the sound guiding hole on the rear side of the auricle and the ear canal. In this case, the acoustic output apparatus may produce a large sound amplitude at the ear canal since the sound guiding hole on the front side of the auricle is close to the ear canal. The sound amplitude formed by the sound guiding hole on the back of the auricle may be smaller at the ear canal, which may avoid the interference cancellation of the sound at the two sound guiding holes at the ear canal, thereby ensuring that the volume of the sound heard by the user at the ear canal is large. In some embodiments, the acoustic output apparatus may include one or more contact points (e.g., "an inflection point" on a supporting structure to match the shape of the ear) that can contact with the auricle when it is worn. The contact point(s) may be located on a connection line between the two sound guiding holes or on one side of the connection line between the two sound guiding holes. A ratio of the distance between the front sound guiding hole and the contact point(s) to the distance between the rear sound guiding hole and the contact point(s) may be 0.05-1. In some embodiments, the ratio may be 0.1-1. In some embodiments, the ratio may be 0.2-1. In some embodiments, the ratio may be 0.4-1.

In some embodiments, by designing the position of the baffle on the acoustic output apparatus, a distance from a sound guiding hole located on the same side of the baffle as the listening position (for example, the user's ear hole) to the listening position may be less than a distance from a sound guiding hole located on the other side of the baffle to the listening position. In such cases, since the sound guiding hole located on the same side of the baffle as the listening position is close to the listening position, an amplitude of a sound output by the sound guiding hole located on the same side of the baffle as the listening position may be large at the listening position, and an amplitude of a sound output by the sound guiding hole located on the other side of the baffle may be small at the listening position, which reduce the interference and cancellation of the sounds output by two sound guiding holes at the listening position, thereby ensuring that the volume of the sound heard by the user at the listening position is large.

In some embodiments, when the distance from one of the two sound guiding holes to the baffle is much less than the distance from the other of the two sound guiding holes to the baffle, the acoustic output apparatus may have a large volume at the listening position in the near field. In some embodiments, a ratio of the distance from one of the two sound guiding holes to the baffle to the distance from the other of the two sound guiding holes to the baffle may be less than or equal to ⅔. Preferably, the ratio of the distance from one of the two sound guiding holes to the baffle to the distance from the other of the two sound guiding holes to the baffle may be less than or equal to ½. More preferably, the ratio of the distance from one of the two sound guiding holes to the baffle to the distance from the other of the two sound guiding holes to the baffle may be less than or equal to ⅓. More preferably, the ratio of the distance from one of the two sound guiding holes to the baffle to the distance from the other of the two sound guiding holes to the baffle may be less than or equal to ¼. More preferably, the ratio of the distance from one of the two sound guiding holes to the baffle to the distance from the other of the two sound guiding holes to the baffle may be less than or equal to ⅙. More preferably, the ratio of the distance from one of the two sound guiding holes to the baffle to the distance from the other of the two sound guiding holes to the baffle may be less than or equal to ⅟₁₀.

In some embodiments, the two sound guiding holes of the acoustic output apparatus may be located on the same side of the listening position. Merely by way of example, the two sound guiding holes of the acoustic output apparatus may be located below the listening position (e.g., the ear hole of the user). As another example, the two sound guiding holes of the acoustic output apparatus may be located in front of the listening position. It should be noted that the two sound guiding holes of the acoustic output apparatus are not limited to be located below and in front of the listening position. The two sound guiding holes may also be located above the listening position. In other embodiments, the two sound guiding holes of the acoustic output apparatus may not be limited to being set vertically and horizontally. The two sound guide holes of the acoustic output apparatus may also be set obliquely. In addition, the listening position may be located on the connection line between the two sound guiding holes or not on the connection line between the two sound guiding holes. For example, the listening position may be located on the upper, lower, left, or right side of the connection line between the two sound guiding holes.

When the two sound guiding holes of the acoustic output apparatus are located on one side of the listening position and the distance between the two sound guiding holes is constant, the sound guiding hole closer to the listening position may output sound with a larger amplitude at the listening position, and the sound guiding hole on the other side of the baffle may output sound with a smaller amplitude at the listening position, which may reduce the interference and cancellation of the sounds output by the two sound guiding holes, thereby ensuring that the volume of the sound heard by the user at the listening position is large. In some embodiments, a ratio of the distance between the sound guiding hole closer to the listening position and the listening position to the distance between the two sound guiding holes may be less than or equal to 3. Preferably, the ratio of the distance between the sound guiding hole closer to the listening position and the listening position to the distance between the two sound guiding holes may be less than or equal to 1. More preferably, the ratio of the distance between the sound guiding hole closer to the listening position and the listening position to the distance between the two sound guiding holes may be less than or equal to 0.9. More preferably, the ratio of the distance between the sound guiding hole closer to the listening position and the listening position to the distance between the two sound guiding holes may be less than or equal to 0.6. More preferably, the ratio of the distance between the sound guiding hole closer to the listening position and the listening position to the distance between the two sound guiding holes may be less than or equal to 0.3.

Figure 25:
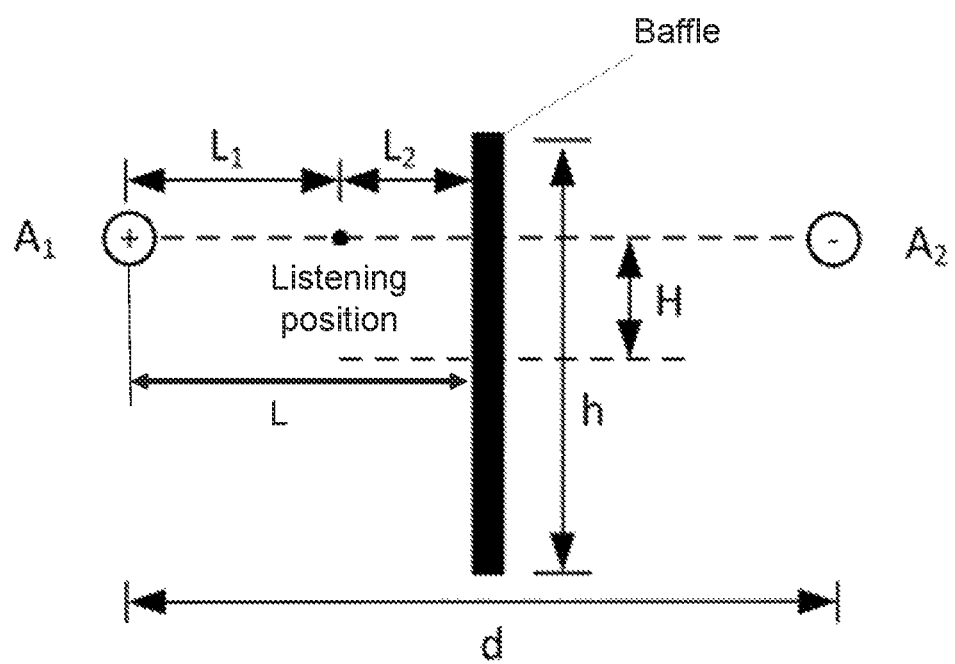
FIG. 25 is a diagram illustrating an exemplary configuration of two point sources and a baffle according to some embodiments of the present disclosure.

FIG. 25 is a diagram illustrating an exemplary configuration of two point sources and a baffle according to some embodiments of the present disclosure. In some embodiments, a position of the baffle between the two sound guiding holes may also have a certain influence on the sound output effect. Merely by way of example, as shown in FIG. 25, a baffle may be provided between a point source $A_1$ and a point source $A_2$. The listening position (for example, the user's ear hole) may be located on the connection line between the point source $A_1$ and the point source $A_2$, and the listening position may be between the point source $A_1$ and the baffle. A distance between the point source $A_1$ and the baffle may be L. A distance between the point source $A_1$ and the point source $A_2$ may be d. A distance between the point source $A_1$ and the listening position may be $L_1$, and a distance between the listening position and the baffle may be $L_2$. A height of the baffle in a direction perpendicular to the connection line between the two point sources may be h. A distance from a center of the baffle to the connection line between the two point sources may be H. When the distance $L_1$ between the listening position and the point source $A_1$ is constant, a position of the baffle may be moved, so that the distance L between the point source $A_1$ and the baffle and the distance d between the two point sources may have different proportional relationships. A volume of the sound heard by the user at the listening position and a volume of the far-field leakage under the different proportional relationships may be obtained.

Figure 26:
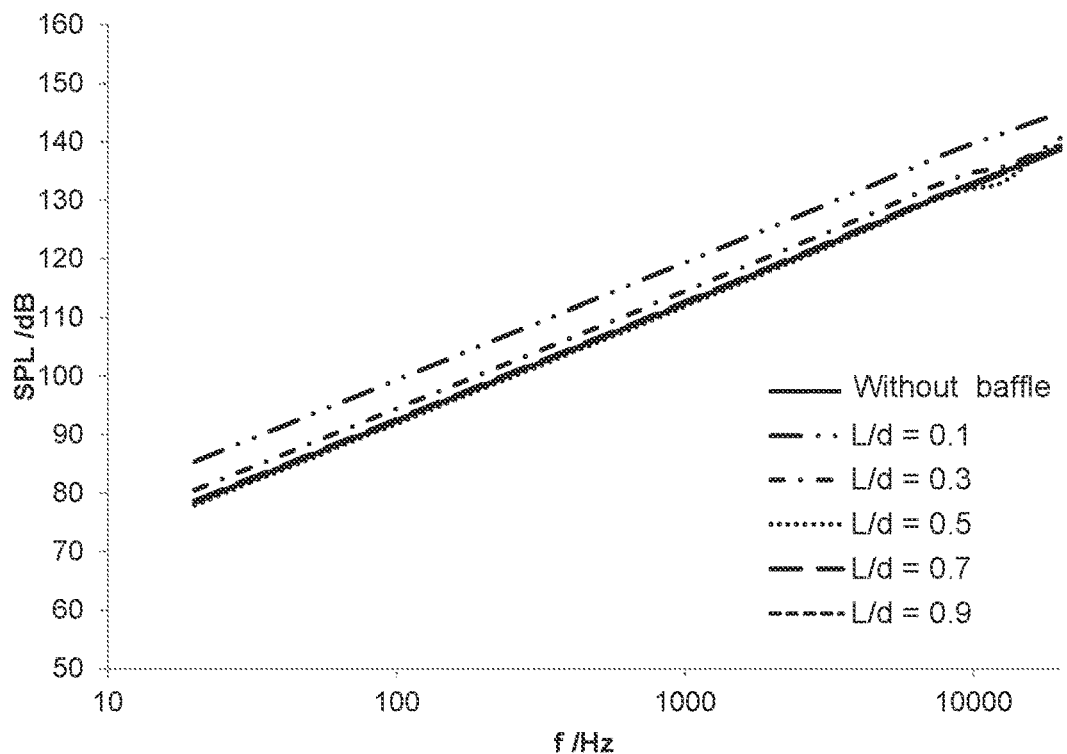
FIG. 26 is a graph illustrating frequency response curves of two point sources without a baffle or with baffles at different positions in a near field according to some embodiments of the present disclosure.
Figure 27:
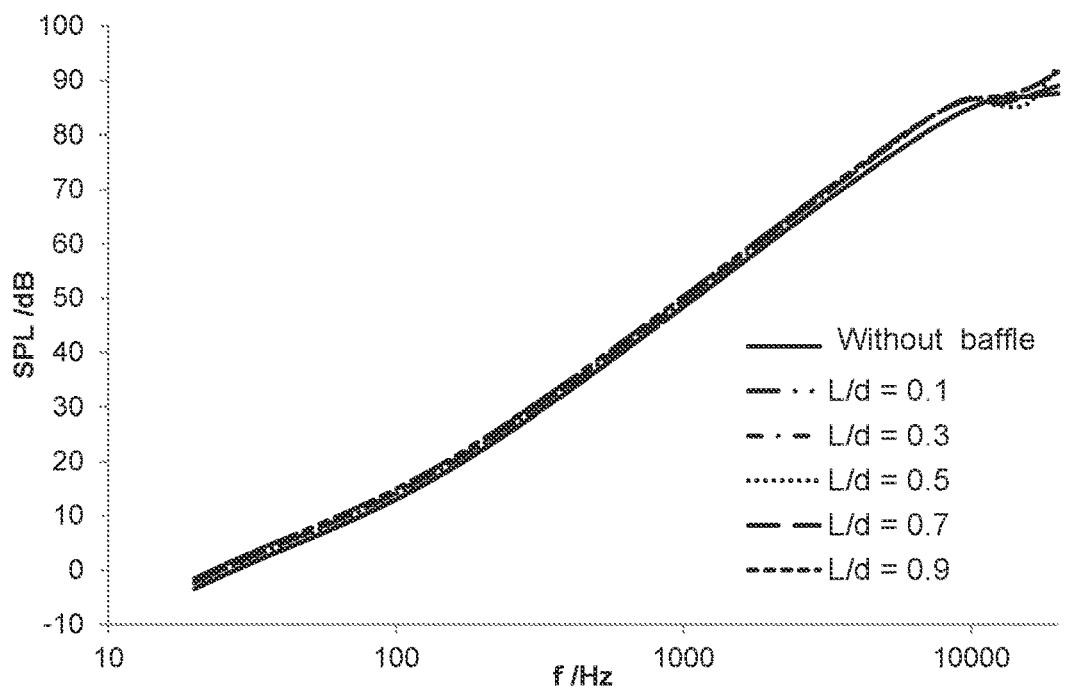
FIG. 27 is a graph illustrating frequency response curves of two point sources without a baffle or with baffles at different positions in a far field according to some embodiments of the present disclosure.
Figure 28:
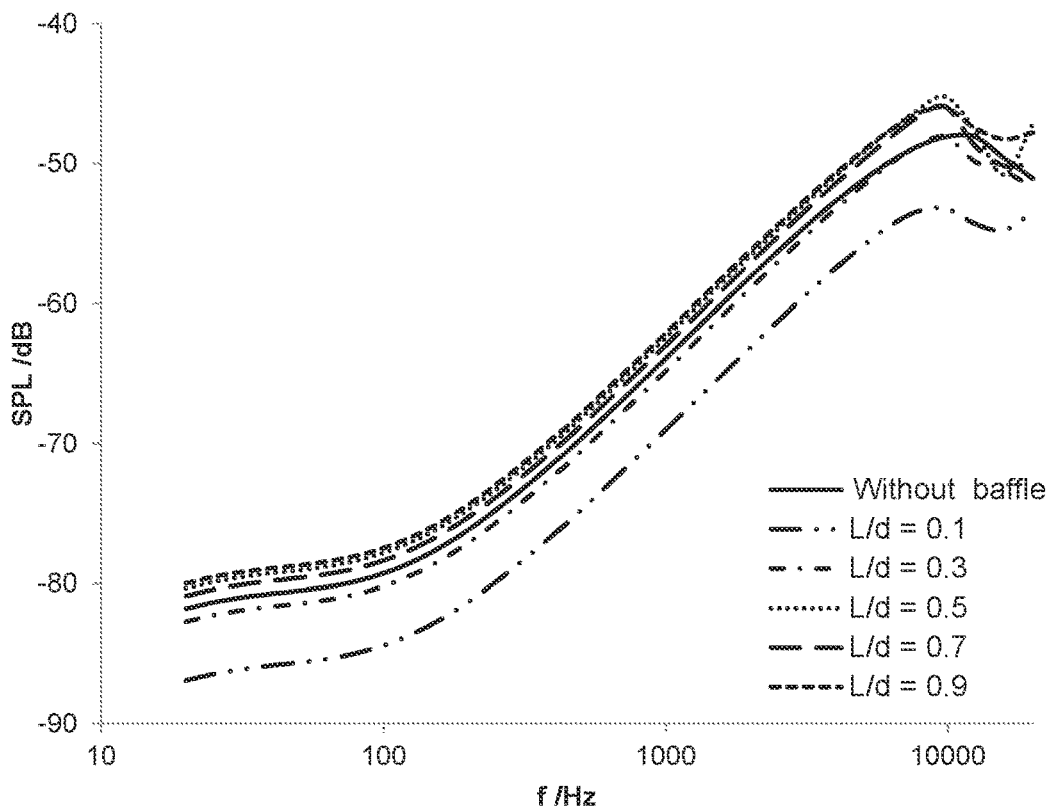
FIG. 28 is a graph illustrating sound leakage indexes of two point sources without a baffle or with baffles at different positions according to some embodiments of the present disclosure.

FIG. 26 is a graph illustrating frequency response curves of two point sources without a baffle or with baffles at different positions in a near field according to some embodiments of the present disclosure. FIG. 27 is a graph illustrating frequency response curves of two point sources without a baffle or with baffles at different positions in a far field according to some embodiments of the present disclosure. FIG. 28 is a graph illustrating sound leakage indexes of two point sources without a baffle or with baffles at different positions according to some embodiments of the present disclosure. According to FIGS. 25-28, the volume of the far-field leakage may vary little with the change of the position of the baffle between the two point sources. In a situation that the distance d between the point source $A_1$ and the point source $A_2$ remains constant, when L decreases, the volume at the listening position may increase, the leakage index may decrease, and the capability to reduce sound leakage may be enhanced. In the same situation, when L increases, the volume at the listening position may increase, the leakage index may increase, and the capability to reduce sound leakage may be weakened. A reason for the above result may be that when L is small, the listening position may be close to the baffle, an acoustic route of the sound wave from the point source $A_2$ to the listening position may be increased due to the baffle. In this case, an acoustic route difference between the point source $A_1$ and the point source $A_2$ to the listening position may be increased and the interference cancellation of the sound may be reduced. As a result, the volume at the listening position may be increased after the baffle is added. When L is large, the listening position may be far away from the baffle. The baffle may have a small effect on the acoustic route difference between the point source $A_1$ and the point source $A_2$ to the listening position. As a result, a volume change at the listening position may be small after the baffle is added.

As described above, by designing positions of the sound guiding holes on the acoustic output apparatus, the baffle (or an auricle of a human body) may separate different sound guiding holes when the user wears the acoustic output apparatus, such that a structure of the acoustic output apparatus may be simplified and the output effect of the acoustic output apparatus may be further improved.

In some embodiments, the position of the two sound guiding holes may be designed so that when the user wears the acoustic output apparatus, a ratio of a distance between the sound guiding hole on the front side of the auricle and the auricle (or a contact point on the acoustic output apparatus for contacting with the auricle) to a distance between the two sound guiding holes may be less than or equal to 0.5. Preferably, the ratio of the distance between the sound guiding hole on the front side of the auricle and the auricle (or the contact point on the acoustic output apparatus for contacting with the auricle) to the distance between the two sound guiding holes may be less than or equal to 0.3. More preferably, the ratio of the distance between the sound guiding hole on the front side of the auricle and the auricle (or the contact point on the acoustic output apparatus for contacting with the auricle) to the distance between the two sound guiding holes may be less than or equal to 0.1.

In some embodiments, the positions of the two sound guiding holes may be designed so that when the user wears the acoustic output apparatus, a ratio of a distance between a sound guiding hole near the listening position (e.g., an entrance position of an ear canal of a human body) and the baffle to the distance between the two sound guiding holes may be less than or equal to 0.5. Preferably, the ratio of the distance between the sound guiding hole near the listening position and the baffle to the distance between the two sound guiding holes may be less than or equal to 0.3.

It should be noted that an acoustic route from an acoustic driver to a sound guiding hole in the acoustic output apparatus may have a certain effect on the volumes of the near-field sound and far-field sound leakage. The acoustic route may be changed by adjusting a cavity length between a vibration diaphragm in the acoustic output apparatus and the sound guiding hole. In some embodiments, the acoustic driver may include a vibration diaphragm. The front and rear sides of the vibration diaphragm may be coupled to two sound guiding holes through a front chamber and a rear chamber, respectively. The acoustic routes from the vibration diaphragm to the two sound guiding holes may be different. In some embodiments, a ratio of a first length to a second length may be 0.5-2, wherein the first length is the length of the acoustic route between the vibration diaphragm and one of the two sound guiding holes, and the second length is the length of the acoustic route between the vibration diaphragm and the other one of the two sound guiding holes. Preferably, the ratio of the first length to the second length may be 0.6-1.5. More preferably, the ratio of the first length to the second length may be 0.8-1.2. In other embodiments, when the acoustic output apparatus includes a plurality of acoustic drivers, an acoustic route from each acoustic driver to a sound guiding hole may be adjusted by changing a length of a cavity from an output end of the acoustic driver to the sound guiding hole. Merely by way of example, the acoustic output apparatus may include a first acoustic driver and a second acoustic driver, and the two sound guiding holes may include a first sound guiding hole and a second sound guiding hole. The first acoustic driver and the second acoustic driver may be coupled to two sound guiding holes through a first cavity and a second cavity, respectively. A first acoustic route from an output end of the first acoustic driver to the first sound guiding hole may be different from a second acoustic route from an output end of the second acoustic driver to the second sound guiding hole. A ratio of the length of the first acoustic route to the length of the second acoustic route may be 0.5-2. Preferably, the ratio of the length of the first acoustic route to the length of the second acoustic route may be 0.6-1.5. More preferably, the ratio of the length of the first acoustic route to the length of the second acoustic route may be 0.8-1.2.

In some embodiments, on the premise of keeping the phases of the sounds generated at the two sound guiding holes opposite, the amplitudes of the sounds generated at the two sound guiding holes may be changed to improve the output effect of the acoustic output apparatus. Specifically, impedances of acoustic routes connecting the acoustic driver and the two sound guiding holes may be adjusted so as to adjust the sound amplitude at each of the two sound guiding holes. In some embodiments of this specification, the impedance may refer to a resistance that a medium needs to overcome during displacement when acoustic waves are transmitted. The acoustic routes may or may not be filled with a damping material (e.g., a tuning net, a tuning cotton, etc.) so as to adjust the sound amplitude. For example, a resonance cavity, a sound hole, a sound slit, a tuning net, and/or a tuning cotton may be disposed in an acoustic route so as to adjust the acoustic resistance of the acoustic route, thereby changing the impedances of the acoustic route. As another example, in some embodiments, an aperture of each of the two sound guiding holes may be adjusted to change the acoustic resistance of the acoustic routes corresponding to the two sound guiding holes. In some embodiments, a ratio of the acoustic impedance of the acoustic route between the acoustic driver (the vibration diaphragm) and one of the two sound guiding holes to the acoustic impedance of the acoustic route between the acoustic driver and the other sound guiding hole may be 0.5-2. Preferably, the ratio of the acoustic impedance of the acoustic route between the acoustic driver (the vibration diaphragm) and one of the two sound guiding holes to the acoustic impedance of the acoustic route between the acoustic driver and the other sound guiding hole may be 0.8-1.2.

In some embodiments, a size of the baffle may affect the sound output effect of the two point sources.

Figure 29:
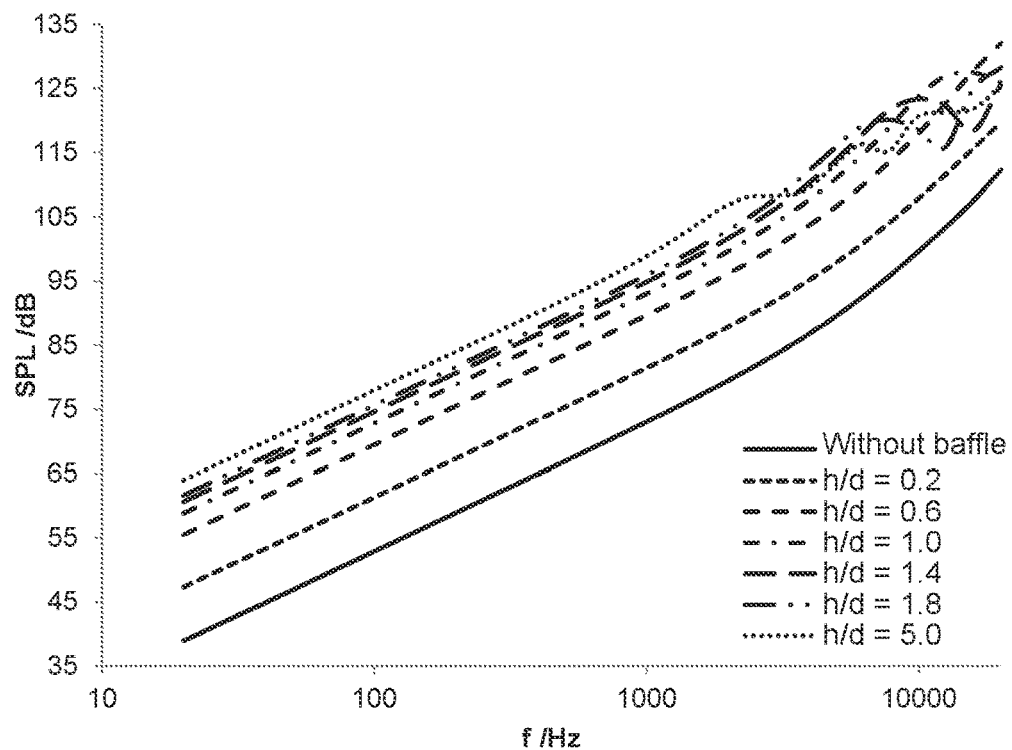
FIG. 29 is a graph illustrating near-field frequency response curves of two point sources without a baffle or with baffles of different heights according to some embodiments in FIG. 25.

FIG. 29 is a graph illustrating near-field frequency response curves of two point sources without a baffle or with baffles of different heights according to some embodiments in FIG. 25. As shown in FIG. 29, at the listening position in the near field, a volume of the near-field sound when baffles of different heights (that is, "h/d" shown in FIG. 29) are set between the two point sources may be greater than a volume of the near-field sound when no baffle (that is, "without baffle" shown in FIG. 29) between the two sound guiding holes. Further, as the height of the baffle increases, that is, a ratio of the height of the baffle to the distance between the two point sources increases, the volume provided by the two point sources at the listening position (i.e., the near-field sound) may gradually increase. It may be concluded that an appropriate increase in the height of the baffle may effectively increase the volume at the listening position.

Figure 30:
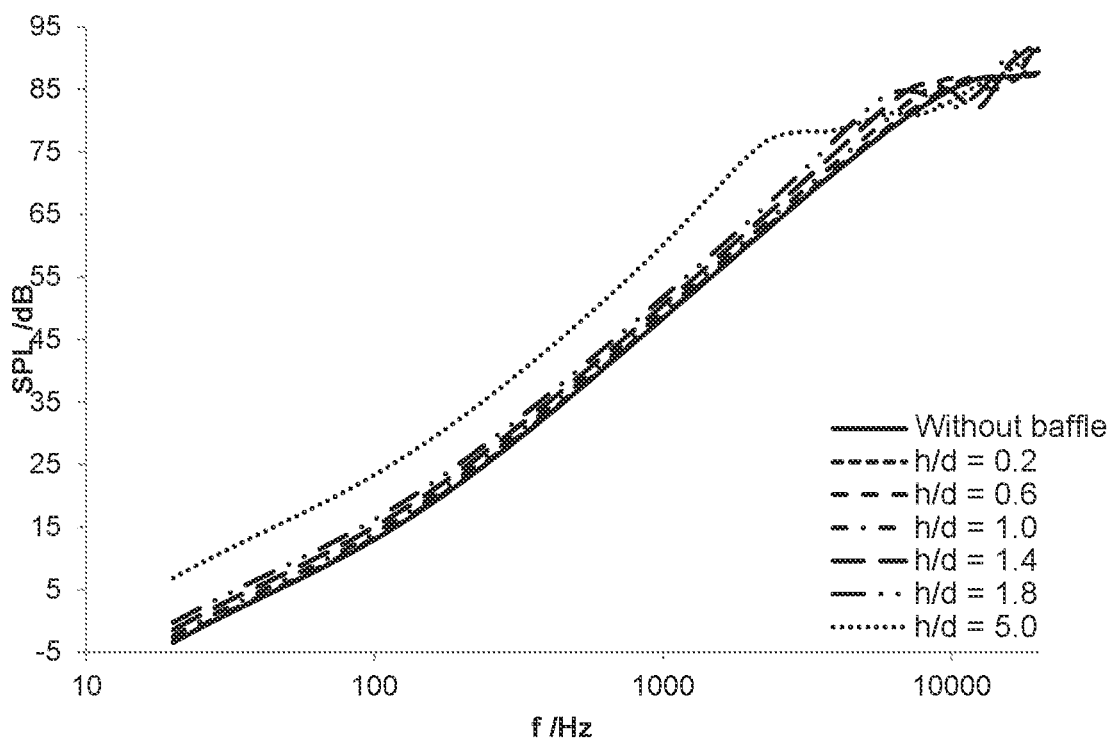
FIG. 30 is a graph illustrating far-field frequency response curves of two point sources without a baffle or with baffles of different heights according to some embodiments in FIG. 25.

FIG. 30 is a graph illustrating far-field frequency response curves of two point sources without a baffle or with baffles of different heights according to some embodiments in FIG. 25. As shown in FIG. 30, in the far field (for example, positions in the environmental far away from the user's ear), when the ratio h/d of the height of the baffle to the distance between the two point sources changes within a certain range (for example, as shown in FIG. 30, h/d is equal to 0.2, 0.6, 1.0, 1.4, 1.8), a volume of the leaked sound generated by the two point sources may be similar to a volume of the leaked sound generated by the two point sources without a baffle. When the ratio h/d of the height of the baffle to the distance between the two point sources increases to a certain amount (for example, h/d is equal to 5.0), the volume of the leaked sound generated by the two point sources at the far field may be larger than the volume of the leaked sound generated by the two point sources without a baffle. Therefore, in order to avoid a larger sound leakage in the far field, the size of the baffle between the two point sources should not be too large.

Figure 31:
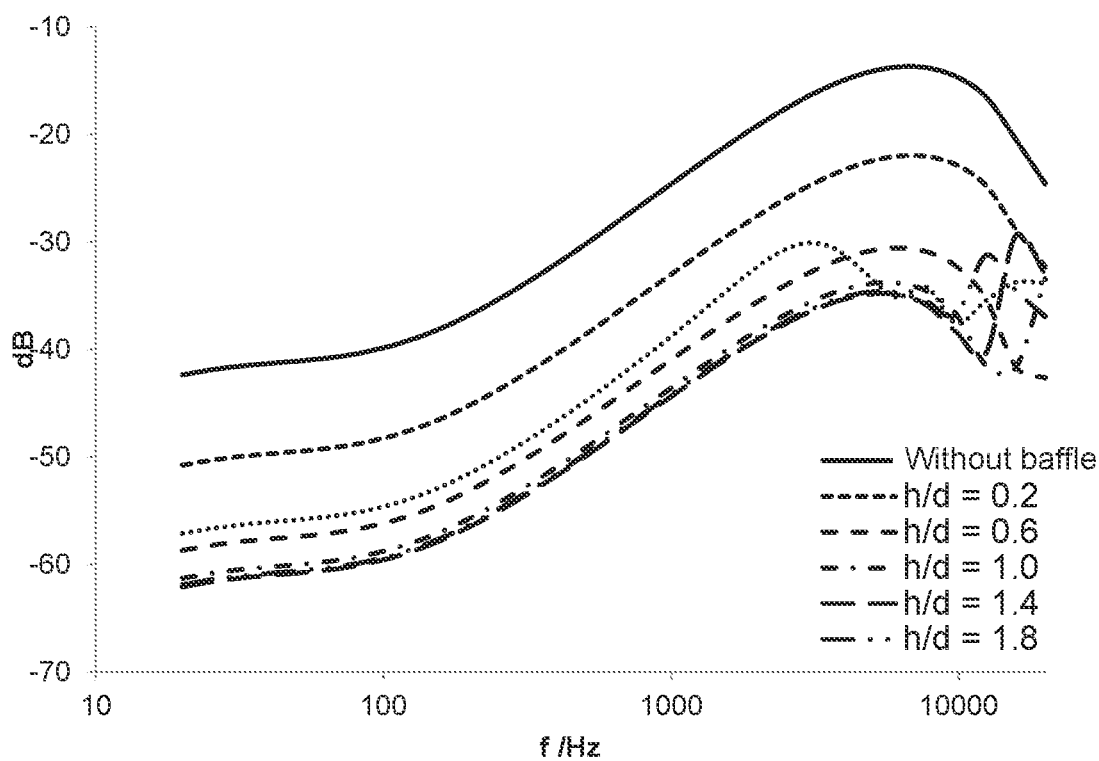
FIG. 31 is a graph illustrating sound leakage indexes of two point sources without a baffle or with baffles of different heights according to some embodiments in FIG. 25.

FIG. 31 is a graph illustrating sound leakage indexes of two point sources without a baffle or with baffles of different heights according to some embodiments in FIG. 25. As shown in FIG. 31, the sound leakage indexes when the baffles of different heights are set between the two point sources may be smaller than the sound leakage indexes when no baffle is set between the two point sources. Therefore, in some embodiments, in order to keep the sound output by the acoustic output apparatus as loud as possible in the near field and suppress the sound leakage in the far field, a baffle may be set between the two sound guiding holes, and a ratio of the height of the baffle to the distance between the two sound guiding holes may be less than or equal to 5. Preferably, the ratio of the height of the baffle to the distance between the two sound guiding holes may be less than or equal to 3. More preferably, the ratio of the height of the baffle to the distance between the two sound guiding holes may be less than or equal to 2. More preferably, the ratio of the height of the baffle to the distance between the two sound guiding holes may be less than or equal to 1.8. More preferably, the ratio of the height of the baffle to the distance between the two sound guiding holes may be less than or equal to 1.5.

In some embodiments, when an auricle of the human body is used as the baffle of the acoustic output apparatus, a ratio of a height of the auricle to the distance between the two sound guiding holes may be less than or equal to 5. Preferably, the ratio of the height of the auricle to the distance between the two sound guiding holes may be less than or equal to 4. More preferably, the ratio of the height of the auricle to the distance between the two sound guiding holes may be less than or equal to 3. More preferably, the ratio of the height of the auricle to the distance between the two sound guiding holes may be less than or equal to 2. More preferably, the ratio of the height of the auricle to the distance between the two sound guiding holes may be less than or equal to 1.8. More preferably, the ratio of the height of the auricle to the distance between the two sound guiding holes may be less than or equal to 1.5. In some embodiments of the present disclosure, the height of the auricle may refer to a length of the auricle along a direction perpendicular to a sagittal plane.

When the listening position and the positions of the two point sources are fixed, a distance between a center of the baffle and the connection line between the two point sources may affect the volume of the near-field sound and the volume of far-field leakage of the acoustic output apparatus. According to FIG. 25, the height of the baffle may be expressed as h, and the distance from the center of the baffle to the connection line between the two point sources may be expressed as H. When the distance d between the two point sources remains unchanged, the distance H from the center of the baffle to the connection line between the two point sources is changed, such that the distance H from the center of the baffle to the connection line between the two point sources and the height h of the baffle may have different proportional relationships. Further, volumes of sounds at the listening position and volumes of far-field leakage under the different proportional relationships may be obtained. In some embodiments, the center of the baffle may refer to a midpoint along a height direction of the baffle (i.e., a midpoint of a length of the baffle along a direction perpendicular to the connection line between the two point sources). It should be noted that the baffle is not limited to the baffle with the intersection of the baffle and the connection line between the two point sources as shown in FIG. 25. The baffle may also be located above or below the connection line between the two point sources as a whole.

Figure 32:
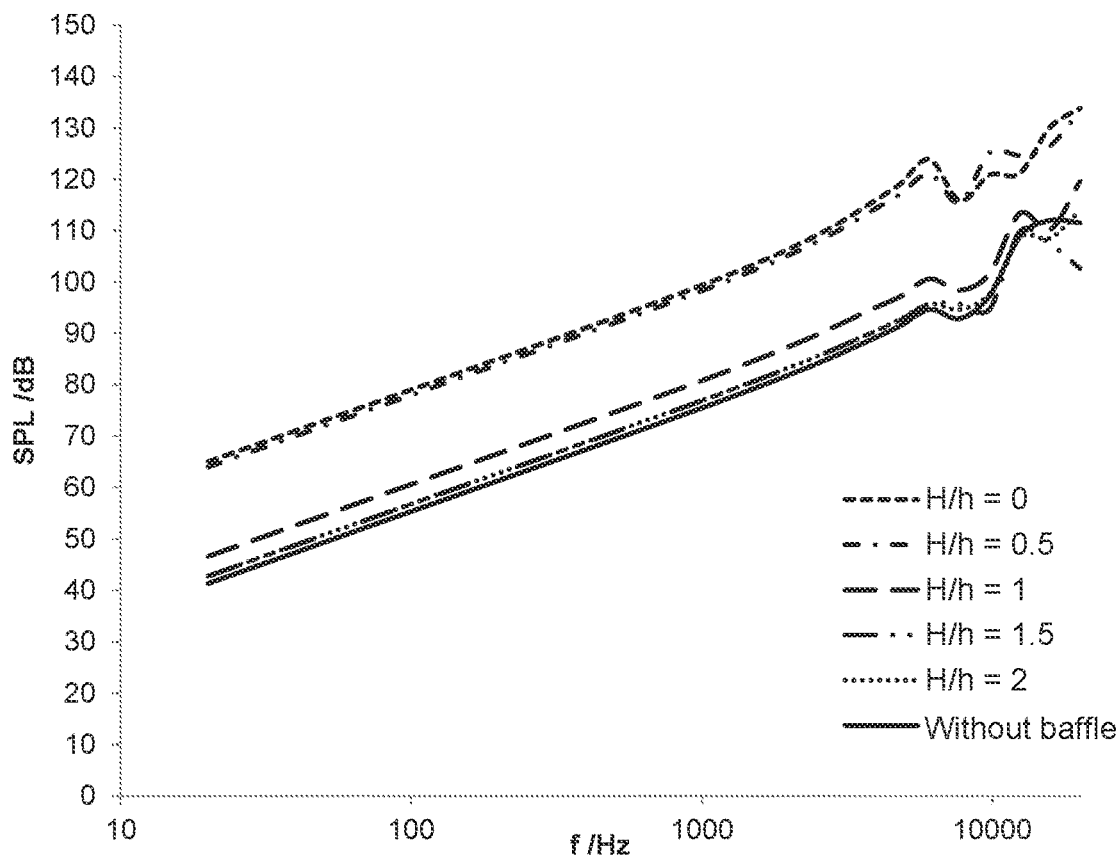
FIG. 32 is a graph illustrating near-field frequency response curves of two point sources with different ratios of a distance between a center of a baffle and a connection line between the two point sources to a height of the baffle according to some embodiments in FIG. 25.
Figure 33:
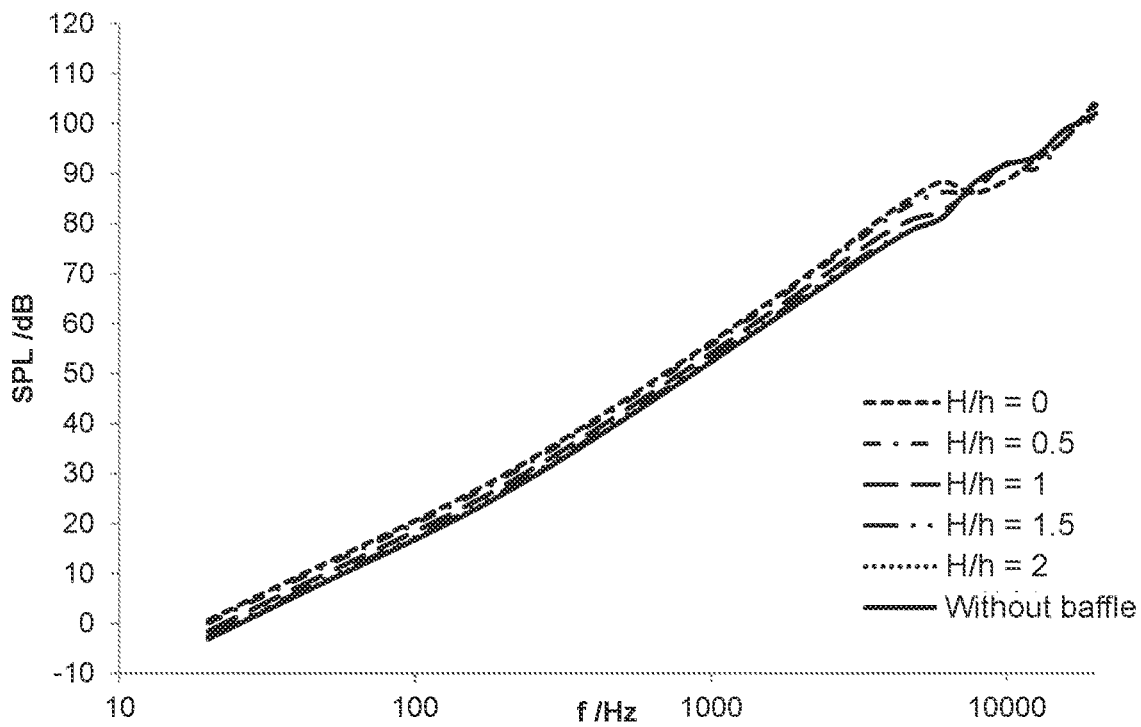
FIG. 33 is a graph illustrating far-field frequency response curves of two point sources with different ratios of a distance between a center of a baffle and a connection line between the two point sources to a height of the baffle according to some embodiments in FIG. 25.
Figure 34:
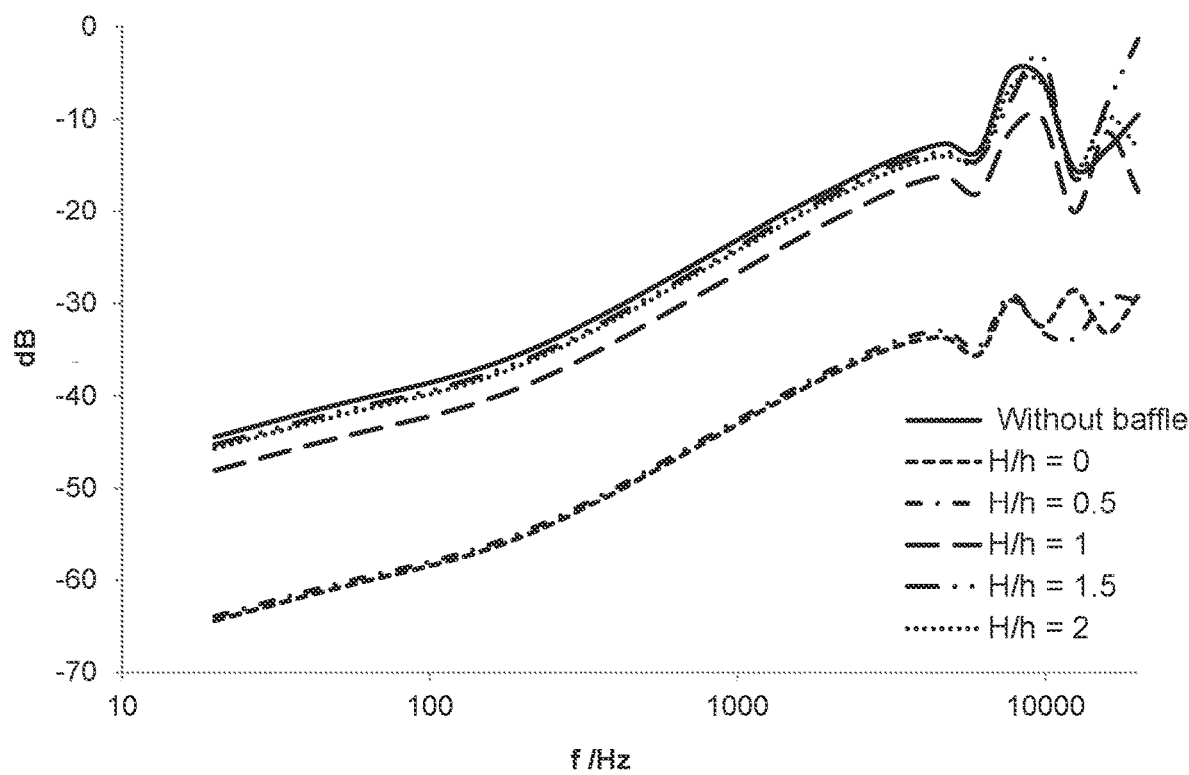
FIG. 34 is a graph illustrating sound leakage indexes of two point sources with different ratios of a distance between a center of a baffle and a connection line between the two point sources to a height of the baffle according to some embodiments in FIG. 25.

FIG. 32 is a graph illustrating near-field frequency response curves of two point sources with different ratios of a distance between a center of a baffle and a connection line between the two point sources to a height of the baffle according to some embodiments in FIG. 25. As shown in FIG. 32, the volume of sound at the listening position in the near field when the baffles with different positions are set between the two point sources (that is, "H/h" shown in FIG. 32) may be greater than that when no baffle is set between the two point sources (that is, "without baffle" in FIG. 32). Further, as the distance from the center of the baffle to the connection line between the two point sources gradually increases, the volume of sound at the listening position in the near field may gradually decrease. The reason may be that when the center of the baffle is far away from the connection line between the two point sources, the barrier effect of the baffle on the sounds from the two point sources to the listening position may be weakened. As a result, the degree of interference and cancellation of the sounds of the two point sources at the listening position may become larger, which results in a decrease in the volume of sound at the listening position. FIG. 33 is a graph illustrating far-field frequency response curves of two point sources with different ratios of a distance between a center of a baffle and a connection line between the two point sources to a height of the baffle according to some embodiments in FIG. 25. In the far field, the volume of the leaked sound when the baffles with different positions are set between the two point sources may be similar to that when no baffle is set between the two point sources. FIG. 34 is a graph illustrating sound leakage indexes of two point sources with different ratios of a distance between a center of a baffle and a connection line between the two point sources to a height of the baffle according to some embodiments in FIG. 25. As shown in FIG. 34, the sound leakage indexes when the baffles with different positions (that is, different "H/h" shown in FIG. 34) are set between the two point sources may be less than that when no baffle (that is, "without baffle" shown in FIG. 34) is set between the two point sources, which may indicate that the ability to reduce the sound leakage is stronger when the baffles with different positions are set between the two point sources. Further, as the center of the baffle gradually approaches, that is, as the distance between the center of the baffle and the connection line between the two point sources gradually decreases, the sound leakage indexes may gradually decrease, that is the ability to reduce the sound leakage is gradually enhanced. In some embodiments, in order to keep the sound output by the acoustic output apparatus as loud as possible in the near field and suppress the sound leakage in the far field, a ratio of the distance between the center of the baffle and the connection line between the two sound guiding holes to the height of the baffle may be less than or equal to 2. Preferably, the ratio of the distance between the center of the baffle and the connection line between the two sound guiding holes to the height of the baffle may be less than or equal to 1.5. More preferably, the ratio of the distance between the center of the baffle and the connection line between the two sound guiding holes to the height of the baffle may be less than or equal to 1. More preferably, the ratio of the distance between the center of the baffle and the connection line between the two sound guiding holes to the height of the baffle may be less than or equal to 0.5. More preferably, the ratio of the distance between the center of the baffle and the connection line between the two sound guiding holes to the height of the baffle may be less than or equal to 0.3.

Figure 35:
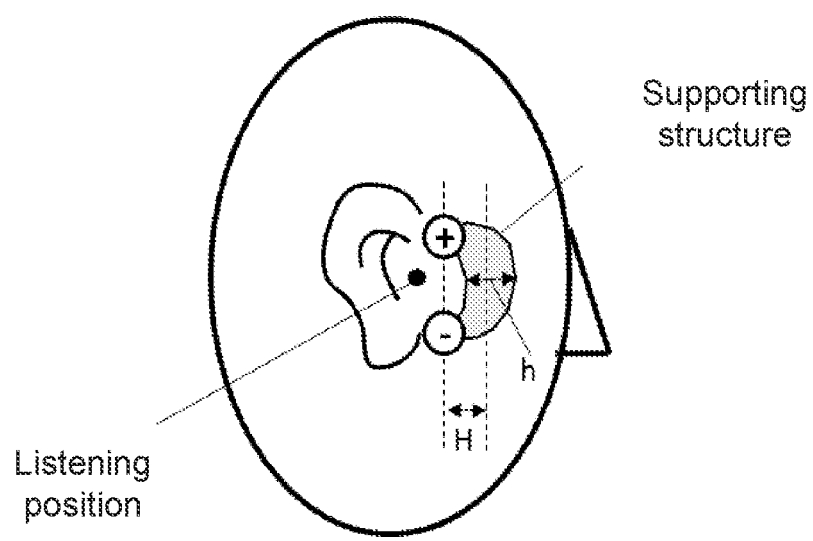
FIG. 35 is a schematic diagram illustrating an exemplary structure of an acoustic output apparatus according to some embodiments of the present disclosure.

In some embodiments, the supporting structure of the acoustic output apparatus may function as a baffle. For example, one of the two sound guiding holes may be provided on a side of the supporting structure facing the user's ear, and the opening direction of that sound guiding hole may be toward the user's ear. The other of the two sound guiding holes may be provided on a side of the supporting structure away from the user's ear, and the opening direction of that sound guiding hole may be away from the user's ear. In such cases, a distance from a structure center (e.g., a center of mass or a center of a shape of the supporting structure) of the supporting structure to the connection line between the two sound guiding holes may affect the volume of the near-field sound and the volume of the far-field leakage of the acoustic output apparatus. As used herein, the structure center of the supporting structure may refer to a center of the supporting structure in a direction perpendicular to the connection line between the two sound guiding holes. For the convenience of description, as shown in FIG. 35, the two sound guiding holes of the acoustic output apparatus may be located at two ends of the supporting structure ("+" may indicate the sound generated by the sound guiding hole facing away from the ear, and "−" may indicate the sound generated by the sound guiding hole facing towards the ear). The distance between the structural center of the supporting structure and the connection line between the two sound guiding holes may be expressed as H, and a height of the supporting structure may be expressed as h. In some embodiments, a ratio of the distance between the structural center of the supporting structure and the connection line between the two sound guiding holes to the height of the baffle (i.e., the supporting structure) may be less than or equal to 2. Preferably, the ratio of the distance between the structural center of the supporting structure and the connection line between the two sound guiding holes to the height of the baffle (i.e., the supporting structure) may be less than or equal to 1.5. More preferably, the ratio of the distance between the structural center of the supporting structure and the connection line between the two sound guiding holes to the height of the baffle (i.e., the supporting structure) may be less than or equal to 1. More preferably, the ratio of the distance between the structural center of the supporting structure and the connection line between the two sound guiding holes to the height of the baffle (i.e., the supporting structure) may be less than or equal to 0.5. More preferably, the ratio of the distance between the structural center of the supporting structure and the connection line between the two sound guiding holes to the height of the baffle (i.e., the supporting structure) may be less than or equal to 0.3.

It should be noted that the above descriptions are merely for the convenience of description, and not intended to limit the present disclosure. It may be understood that, for those skilled in the art, after understanding the principle of the present disclosure, various modifications and changes in the forms and details may be made to the above acoustic output apparatus without departing from this principle. In some embodiments, the two sound guiding holes of the acoustic output apparatus in FIG. 35 may be not limited to being set vertically shown in FIG. 35, and may also be set in other manners. For example, in some embodiments, the two sound guiding holes may also be set horizontally (for example, one of the two sound guiding holes may be located on a front side of the ear, and the other of the two sound guiding holes may be located on a back side of the ear) or obliquely. In some embodiments, the two sound guiding holes in FIG. 35 may be not limited to being located on both sides of the listening position, and may also be located on a same side of the listening position. For example, two sound guiding holes may be located above, below, or in front of the listening position. These changes are all within the protection scope of the present disclosure.

When the acoustic output apparatus has more than two sound guiding holes, that is, there are more than two point sources in the acoustic output apparatus, a baffle may be provided between any two of the plurality of point sources. Through the cooperation of the plurality of point sources and the plurality of baffles, the acoustic output apparatus may achieve a better sound output effect. In some embodiments, the plurality of point sources may include at least one set of two point sources with opposite phases. In order to further explain the coordination of the plurality of point sources and the plurality of baffles in the acoustic output apparatus, a detailed description may be given below in connection with FIG. 36.

Figure 36:
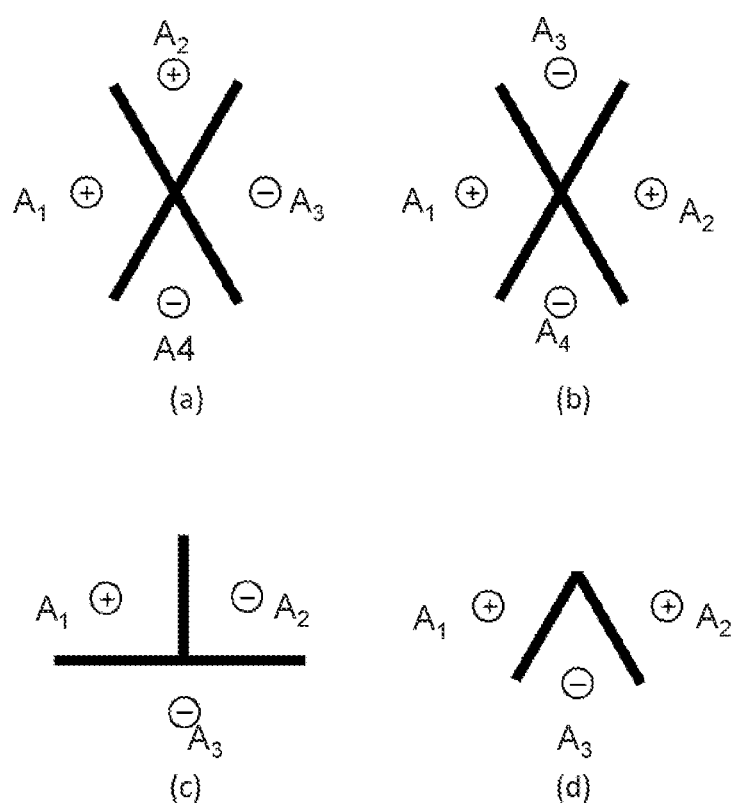
FIG. 36 is a schematic diagram illustrating a distribution of point sources and baffles according to some embodiments of the present disclosure.

FIG. 36 is a schematic diagram illustrating a distribution of point sources and baffles according to some embodiments of the present disclosure. As shown in (a) and (b) in FIG. 36, the acoustic output apparatus may include four point sources (respectively corresponding to four sound guiding holes on the acoustic output apparatus). A point source $A_1$ and a point source $A_2$ may have a same phase. A point source $A_3$ and a point source $A_4$ may have a same phase. The point source $A_1$ and the point source $A_3$ may have opposite phases. The point source $A_1$, the point source $A_2$, the point source $A_3$, and the point source $A_4$ may be separated by two cross-arranged baffles or a plurality of spliced baffles. The point source $A_1$ and the point source $A_3$ (or the point source $A_4$), and the point source $A_2$ and the point source $A_3$ (or the point source $A_4$) may respectively form two point sources as described elsewhere in the present disclosure. As shown in (a) in FIG. 36, the point source $A_1$ and the point source $A_3$ may be arranged opposite to each other and may be arranged adjacent to the point source $A_2$ and the point source $A_4$. As shown in (b) in FIG. 36, the point source $A_1$ and the point source $A_2$ are arranged opposite to each other, and may be arranged adjacent to the point source $A_3$ and the point source $A_4$. As shown in (c) FIG. 36, the acoustic output apparatus may include three point sources (respectively corresponding to three sound guiding holes on the acoustic output apparatus). A point source $A_1$ and a point source $A_2$ may have opposite phases, and the point source $A_1$ and a point source $A_3$ may have opposite phases, which may form two sets of two point sources as described elsewhere in the present disclosure. The point source $A_1$, the point source $A_2$, and the point source $A_3$ may be separated by two intersecting baffles. As shown in (d) in FIG. 36, the acoustic output apparatus may include three point sources (respectively corresponding to three sound guiding holes on the acoustic output apparatus). A point source $A_1$ and a point source $A_2$ may have a same phase, and the point source $A_1$ and a point source $A_3$ may have opposite phases. The point source $A_1$ and the point source $A_3$, and the point source $A_2$ and the point source $A_3$ may respectively form two point sources as described elsewhere in the present disclosure. The point source $A_1$, the point source $A_2$, and the point source $A_3$ may be separated by a V-shaped baffle.

Figure 37:
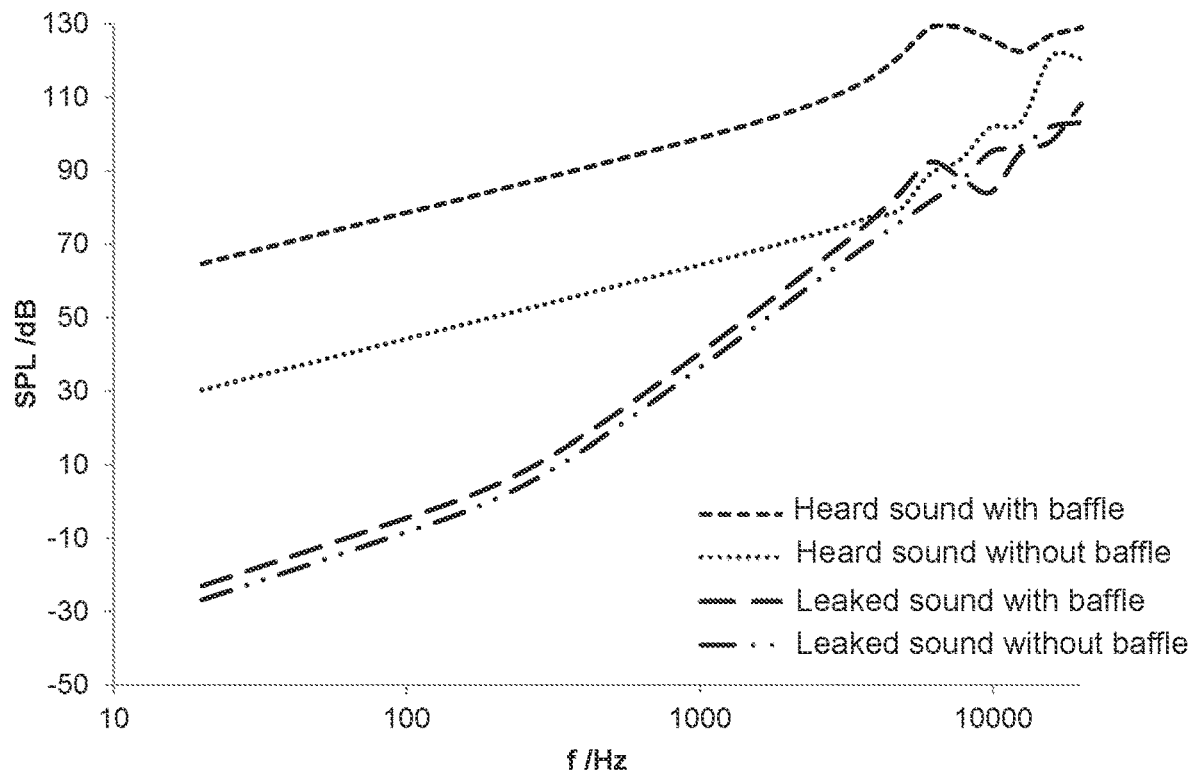
FIG. 37 is a graph illustrating near-field and far-field frequency response curves of multi-point sources with and without baffles between multi-point sources according to some embodiments in FIG. 36.
Figure 38:
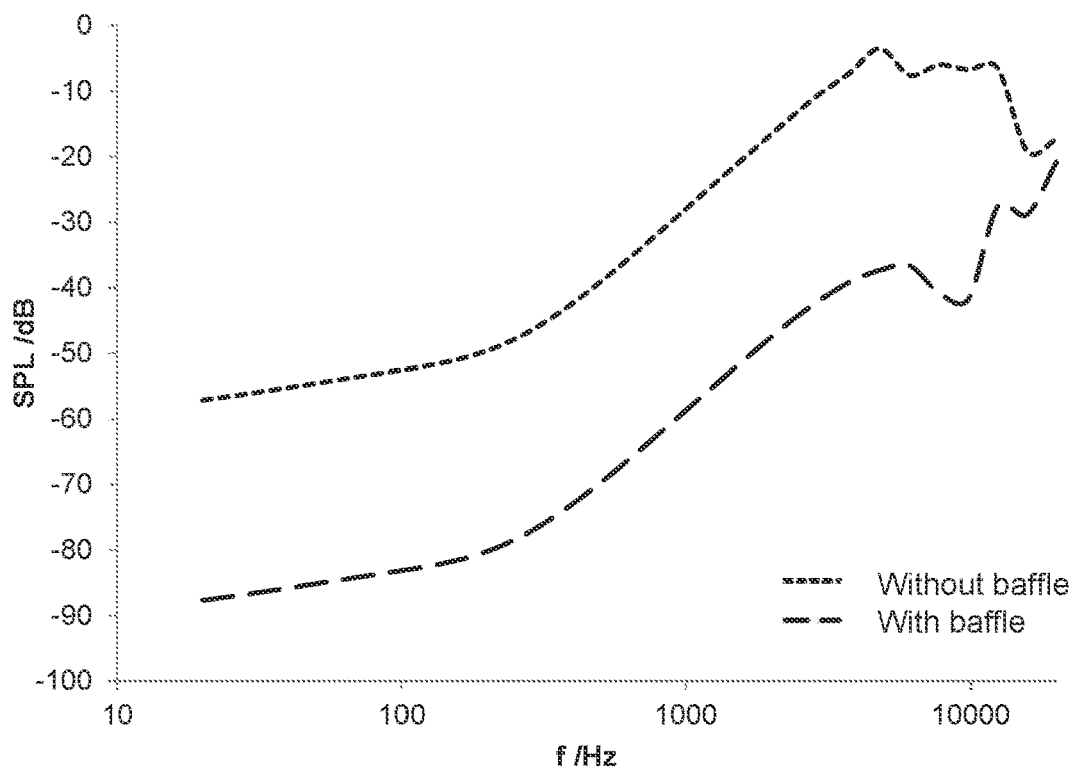
FIG. 38 is a graph illustrating sound leakage indexes of multi-point sources with and without baffles between multi-point sources according to some embodiments in FIG. 36.
Figure 39:
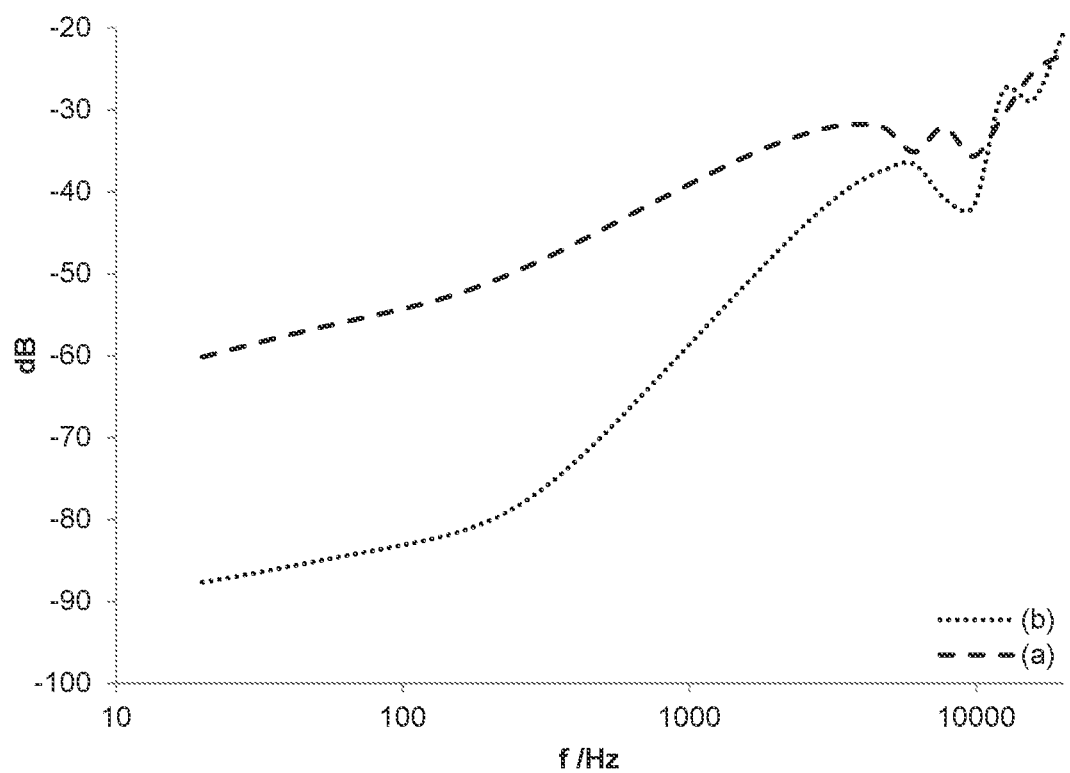
FIG. 39 is a graph illustrating sound leakage indexes of multi-point sources corresponding to two distribution modes shown in (a) and (b) in FIG. 36.

FIG. 37 is a graph illustrating near-field and far-field frequency response curves of multi-point sources with and without baffles between multi-point sources according to some embodiments in FIG. 36. As shown in FIG. 37, in the near field, the volume of the sound heard by the user when baffles are set between the multi-point sources (for example, the point source $A_1$, the point source $A_2$, the point source $A_3$, and the point source $A_4$) may be significantly greater than the volume of the sound heard by the user when no baffle is set between the multi-point sources, which may indicate that the baffles set between multi-point sources may increase the volume of the sound heard by the user in the near field. In the far field, the volume of the leaked sound when the baffles are set between the multi-point sources may be similar to the volume of the leaked sound when no baffle is set between the multi-point sources. FIG. 38 is a graph illustrating sound leakage indexes of multi-point sources with and without baffles between multi-point according to some embodiments in FIG. 36. As shown in FIG. 38, on the whole, the sound leakage indexes when the baffles are set between the multi-point sources may be significantly reduced compared to the sound leakage indexes when no baffle is set between the multi-point sources, which may indicate that the ability to reduce the sound leakage may be significantly enhanced when the baffles are set between the multi-point sources. FIG. 39 is a graph illustrating sound leakage indexes of multi-point sources corresponding to two distribution modes shown in (a) and (b) in FIG. 36. As shown in FIG. 39, in a specific frequency range, among the four point sources, the sound leakage indexes ("(b)" shown in FIG. 39) when two point sources (for example, the point source $A_1$ and the point source $A_2$, the point source $A_3$ and the point source $A_4$ in (b) in FIG. 36) with the same phase are arranged opposite to each other on the periphery of the baffle may be significantly smaller than the sound leakage indexes ("(a)" shown in FIG. 39) when two point sources (for example, the point source $A_1$ and the point source $A_3$, the point source $A_2$ and the point source $A_4$ in (a) in FIG. 36) with opposite phases are arranged opposite to each other on the periphery of the baffle, which may indicate that the ability to reduce the sound leakage of the two point sources with the same phase arranged opposite to each other on the periphery of the baffle or the two point sources with the opposite phases arranged adjacently is stronger.

According to the above contents, in some embodiments, when the acoustic output apparatus includes a plurality of sound guiding holes, in order to keep the sound output by the acoustic output apparatus in the near field as loud as possible, and suppress the sound leakage in the far field, a baffle may be provided between any two of the plurality of sound guiding holes, that is, any two of the plurality of sound guiding holes may be separated by the baffle. Preferably, sounds with the same phase (or approximately the same) or opposite (or approximately opposite) phases may be output between the plurality of sound guiding holes. More preferably, the sound guiding holes that output sounds with the same phase may be arranged oppositely, and the sound guiding holes that output sounds with opposite phases may be arranged adjacently.

It should be noted that the above descriptions are merely for the convenience of description, and not intended to limit the present disclosure. It may be understood that, for those skilled in the art, after understanding the principle of the present disclosure, various modifications and changes in the forms and details of the acoustic output apparatus may be made without departing from this principle. For example, a count of point sources may be not limited to the above two, three, or four, but may also be five, six, seven, or more. A specific distribution form of the point sources and a structure and shape of the baffle may be adjusted according to different counts of point sources. As another example, the shape of the baffle may be not limited to a straight plate shown in some figures in the present disclosure, and the baffle may also be a curved plate with a certain curvature. These changes are all within the protection scope of the present disclosure.

Figure 40:
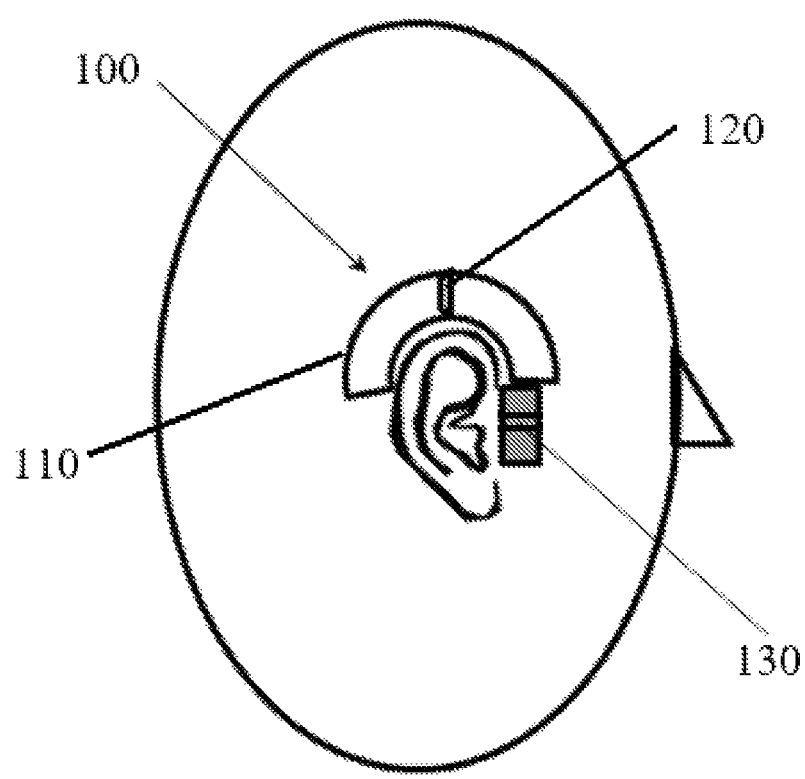
FIG. 40 is a schematic diagram illustrating an exemplary structure of an acoustic output apparatus according to some embodiments of the present disclosure.

FIG. 40 is a schematic diagram illustrating an exemplary structure of an acoustic output apparatus according to some embodiments of the present disclosure.

For human ears, the frequency band of sound that can be heard may be concentrated in a mid-low-frequency band. An optimization goal in the mid-low-frequency band may be to increase a volume of the sound heard by the user. If the listening position is fixed, parameters of the two point sources may be adjusted such that the volume of the sound heard by the user may increase significantly while a volume of leaked sound may be substantially unchanged (an increase in the volume of the sound heard by the user may be greater than an increase in the volume of the sound leakage). In a high-frequency band, a sound leakage reduction effect of the two point sources may be weaker. In the high-frequency band, an optimization goal may be reducing sound leakage. The sound leakage may be further reduced by adjusting the parameters of the two point sources of different frequencies. In some embodiments, the acoustic output apparatus 100 may also include an acoustic driver 130. The acoustic driver 130 may output sounds from a pair of third sound guiding holes. Details regarding the acoustic driver 130, the third sound guiding holes, and a structure between the acoustic driver and the third sound guiding hole may be described with reference to the acoustic driver 120 and the first sound guiding holes 112 and the second sound guiding holes 112. In some embodiments, the acoustic driver 130 and the acoustic driver 120 may output sounds of different frequencies. In some embodiments, the acoustic output apparatus may further include a controller configured to cause the acoustic driver 120 to output sound in the first frequency range, and cause the acoustic driver 130 to output sound in the second frequency range. The second frequency range may include frequencies higher than the first frequency range. For example, the first frequency range may be 100 Hz-1000 Hz, and the second frequency range may be 1000 Hz-10000 Hz. In some embodiments, there is an overlapping frequency range between the first frequency range and the second frequency range. The sounds in the overlapping frequency range may be regarded as being output from the first sound guiding hole, the second sound guiding hole, and the pair of third sound guiding holes together.

In some embodiments, the acoustic driver 120 may be a low-frequency speaker, and the acoustic driver 130 may be a mid-high-frequency speaker. Due to different frequency response characteristics of the low-frequency speaker and the mid-high-frequency speaker, frequency bands of the output sound may also be different. High-frequency bands and low-frequency bands may be divided by using the low-frequency speakers and the mid-high-frequency speakers, and accordingly, two low-frequency point sources and two mid-high-frequency point sources may be constructed to perform near-field sound output and a far-field leakage reduction. For example, the acoustic driver 120 may provide two point sources for outputting low-frequency sound through the sound guiding hole 111 and the sound guiding hole 112, which may be mainly used for outputting sound in low-frequency band. The two low-frequency point sources may be distributed on both sides of an auricle to increase a volume near the near-field ear. The acoustic driver 130 may provide two point sources for outputting mid-high-frequency sound through two second sound guiding holes. A mid-high-frequency sound leakage may be reduced by adjusting a distance between the two second sound guiding holes. The two mid-high-frequency point sources may be distributed on both sides of the auricle or on the same side of the auricle. Alternatively, the acoustic driver 120 may provide two point sources for outputting full-frequency sound through the sound guiding hole 111 and the sound guiding hole 112 so as to further increase the volume of the near-field sound.

Figure 41:
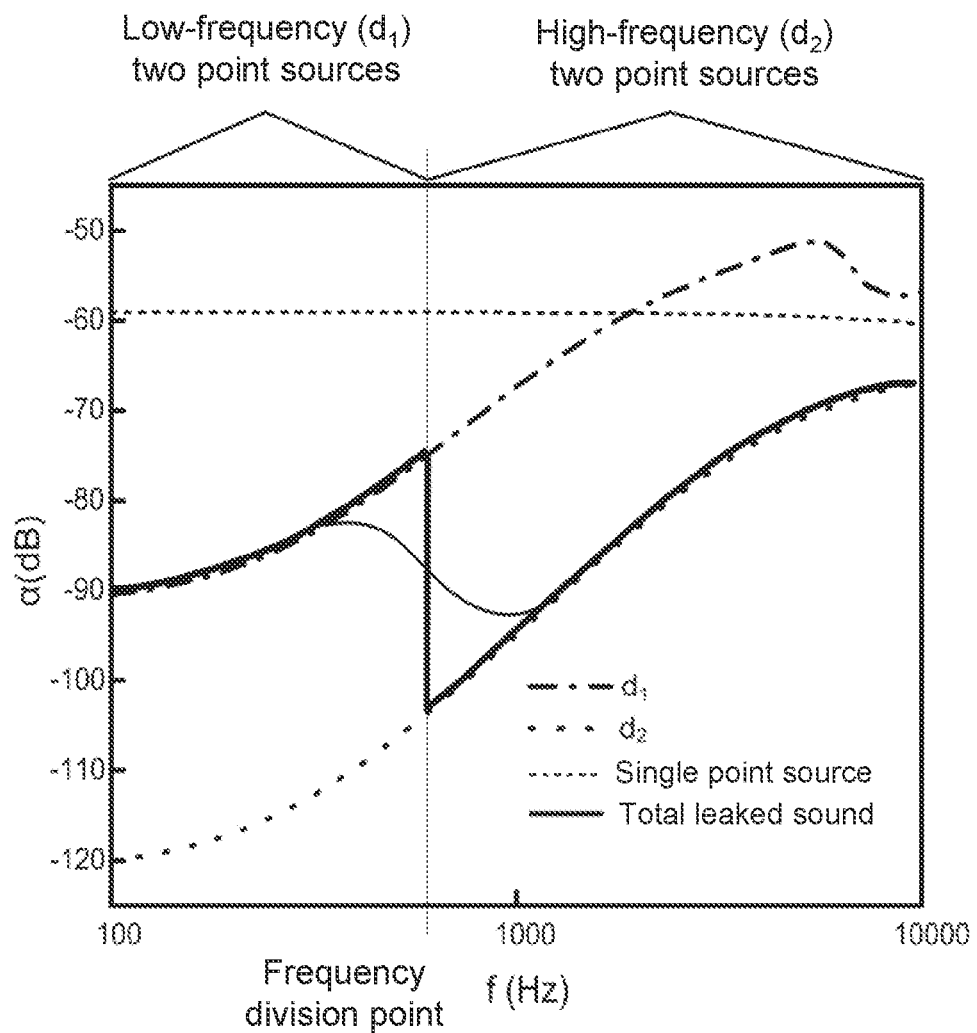
FIG. 41 is a schematic diagram illustrating sound leakage indexes under the action of a combination of low-frequency two point sources and high-frequency two point sources according to some embodiments of the present disclosure.

Further, the distance $d_2$ between the pair of third sound guiding holes may be smaller than the distance $d_1$ between the sound guiding hole 111 and the sound guiding hole 112, that is, $d_1$ may be greater than $d_2$. FIG. 41 is a schematic diagram illustrating sound leakage indexes under the action of a combination of low-frequency two point sources and high-frequency two point sources according to some embodiments of the present disclosure. As shown in FIG. 41, by setting a set of low-frequency two point sources and a set high-frequency two point sources with different distances, a stronger ability to reduce sound leakage may be achieved compared with a single point source. In the low-frequency range, when the distance (d1) between the low-frequency two point sources is adjusted (e.g., increased), the increase in the volume of the near-field sound may be greater than the increase in the volume of the far-field leakage, which may achieve a higher volume of the near-field sound output in the low-frequency band. At the same time, in the low-frequency range, because that the sound leakage of the low frequency two point sources is very small, adjusting (increasing) the distance d1 may slightly increase the sound leakage, but the increased sound leakage is still be kept at a low level (a value is even further reduced). In the high-frequency range, by adjusting (e.g., reducing) the distance (d2) between the high frequency two point sources, the problem that the cutoff frequency of high-frequency sound leakage reduction is too low and the frequency band of the sound leakage reduction is too narrow may be overcome. Therefore, a stronger effect of sound leakage reduction may be achieved in higher frequency bands, which may meet the needs of open acoustic output apparatus.

It should be noted that a curve of a total leaked sound shown in FIG. 41 is an ideal, which is only used to illustrate the principle and effect. Affected by factors such as the filter characteristic of a circuit, the frequency characteristic of a transducer, and the frequency characteristic of an acoustic route, the actual low-frequency and high-frequency sounds output by the acoustic output apparatus may differ from those shown in FIG. 41. In addition, low-frequency and high-frequency sounds may have a certain overlap (aliasing) in the frequency band near the frequency division point, causing the total leaked sound of the acoustic output apparatus does not have a mutation at the frequency division point as shown in FIG. 41. Instead, there may be a gradient and/or a transition in the frequency band near the frequency division point, as shown by a thin solid line in FIG. 41.

In some embodiments, the pair of third sound guiding holes may output sounds with a phase difference. Preferably, the third sound guiding holes may output sounds with opposite phases. In some embodiments, the acoustic driver 130 that output sounds with a phase difference from the third sound guiding holes may be similar to the acoustic driver 120 that outputting sounds from the sound guiding holes as described elsewhere in this disclosure.

Figure 42:
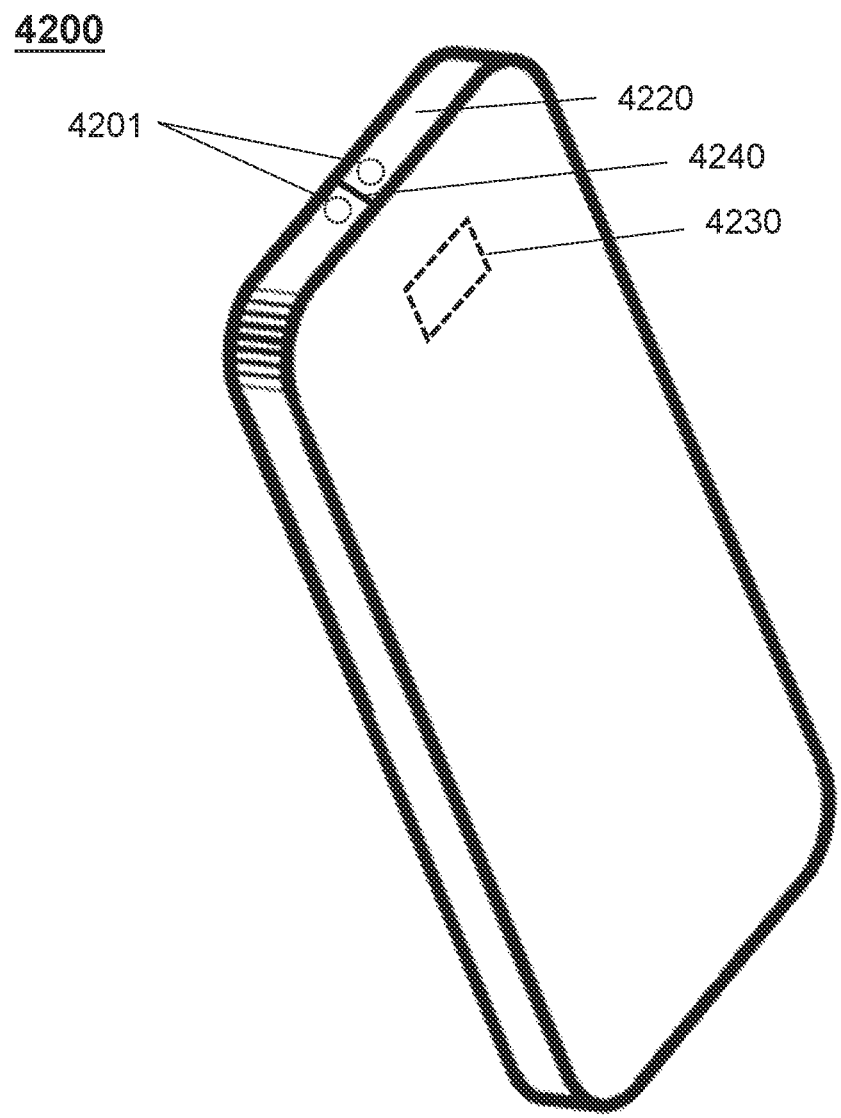
FIG. 42 is a schematic diagram illustrating a phone having sound guiding holes according to some embodiments of the present disclosure.

It should be noted that the descriptions of the present disclosure may not limit an actual use scenario of the acoustic output apparatus. The acoustic output apparatus may be any apparatus outputting the sound or a portion thereof. For example, the acoustic output apparatus may be applied to a phone. FIG. 42 is a schematic diagram illustrating a phone having sound guiding holes according to some embodiments of the present disclosure. As shown in FIG. 42, a plurality of sound guiding holes as described elsewhere in the present disclosure may be arranged on a top 4220 (that is, an upper end perpendicular to a display of the phone 4200) of a phone 4200. Merely by way of example, sound guiding holes 4201 may constitute a set of two point sources (or an array of point sources) for outputting sounds. A first sound guiding hole of the sound guiding holes 4201 may be close to a left end of the top 4220, and a second sound guiding hole of the sound guiding holes 4201 may be close to a right end of the top 4220. The two sound guiding holes may be separated by a certain distance. An acoustic driver 4230 may be provided inside a housing of the phone 4200. The sounds generated by the acoustic driver 4230 may be transmitted outward through the sound guiding holes 4201.

In some embodiments, the two sound guiding holes 4201 may output a set of sounds with the opposite (or approximately the opposite) phase and the same (or approximately the same) amplitude. When a user places the phone near an ear to receive voice information, the sound guiding holes 4201 may be located on both sides of a user's ear, according to the descriptions of other embodiments in the present disclosure, which may be equivalent to increasing an acoustic distance of the sound from the sound guiding hole to the user's ear, so that the sound guiding holes 4201 may output strong near-field sound to the user. Meanwhile, the user's ear may have little effect on sounds output by the sound guiding holes in a far field, so that due to the interference and cancellation of the sounds in the far field, the sound guiding holes 4201 may reduce sound leakage to the surrounding environment. In addition, by arranging the sound guiding holes on the top portion of the phone instead of an upper portion of the display of the phone, a space on a front of the phone may be saved. Therefore, an area of the display of the phone may be further increased and the appearance of the phone more concise and beautiful.

It should be understood that the above descriptions of the sound guiding holes on the phone are merely for illustration purposes. Those skilled in the art may make various modifications to the above structures without departing this principle. The modified structures may be within the protection scope of the present disclosure. For example, all or a portion of the sound guiding holes 4201 may also be set at other positions of the phone 4200, which may still ensure that the user may hear a relatively loud volume when receiving voice information while avoiding leakage of the voice information to the surrounding environment. For example, the first sound guiding hole may be arranged on the top 4220 (relatively close to the user's ear), and the second sound guiding hole may be arranged on a back or a side of the phone 4200 (relatively away from the user's ear). When the user places the first sound guiding hole near the ear to receive the voice information, the housing of the phone 4200 may be equivalent to a "baffle" that "blocks" between the second sound guiding hole and the user's ear, which may add an acoustic distance from the second sound guiding hole to the user's ear. Therefore, a volume heard by the user's ear may be increased. As another example, acoustic drivers that output sounds in different frequency ranges may be disposed inside the housing of the phone 4200, and sound guiding holes corresponding to these acoustic drivers may be provided with or without baffles in the manner described above.

It should be noted that the above descriptions are merely for the convenience of description, and not intended to limit the present disclosure. It may be understood that, for those skilled in the art, after understanding the principle of the present disclosure, various modifications and changes in the forms and details of the acoustic output apparatus may be made without departing from this principle. In some embodiments, the sound guiding hole 111 and the sound guiding hole 112 corresponding to the acoustic driver 120 may not be distributed on both sides of the auricle, and/or the two third guide holes corresponding to the acoustic driver 130 may not be distributed on the front side of the auricle. For example, the pair of third sound guiding holes corresponding to the acoustic driver 130 may be distributed on the same side of the auricle (for example, a rear side, an upper side, or a lower side of the auricle). As another example, the pair of third sound guiding holes corresponding to the acoustic driver 130 may be distributed on both sides of the auricle. As still another example, when the sound guiding hole 111, the sound guiding hole 112, and/or the pair of third sound guiding holes are located on the same side of the auricle, a baffle (e.g., a baffle 4240) may be disposed between the sound guiding holes 111 and the sound guiding hole 112, and/or between the pair of third sound guiding holes to further increase the volume of the near-field sound and reduce the volume of the far-field leakage. As still another example, in some embodiments, the two sound guiding holes corresponding to the acoustic driver 120 may be located on the same side of the auricle (for example, a front side, a rear side, an upper side, and a lower side of the auricle).

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended for those skilled in the art, though not expressly stated herein. These alterations, improvements, and modifications are intended to be suggested by this disclosure and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure, or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures, or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer-readable media having computer-readable program code embodied thereon.

A non-transitory computer-readable signal medium may include a propagated data signal with computer readable program code embodied therein, for example, in baseband or as part of a carrier wave. Such a propagated signal may take any of a variety of forms, including electromagnetic, optical, or the like, or any suitable combination thereof. A computer-readable signal medium may be any computer-readable medium that is not a computer-readable storage medium and that may communicate, propagate, or transport a program for use by or in connection with an instruction execution system, apparatus, or device. Program code embodied on a computer-readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object-oriented programming language such as Java, Scala, Smalltalk, Eiffel, JADE, Emerald, C++, C #, VB. NET, Python or the like, conventional procedural programming languages, such as the "C" programming language, Visual Basic, Fortran, Perl, COBOL, PHP, ABAP, dynamic programming languages such as Python, Ruby, and Groovy, or other programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations, therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution, e.g., an installation on an existing server or mobile device.

Similarly, it should be appreciated that in the foregoing description of embodiments of the present disclosure, various features are sometimes grouped together in a single embodiment, figure, or description thereof to streamline the disclosure aiding in the understanding of one or more of the various inventive embodiments. This method of disclosure, however, is not to be interpreted as reflecting an intention that the claimed object matter requires more features than are expressly recited in each claim. Rather, inventive embodiments lie in less than all features of a single foregoing disclosed embodiment.

In some embodiments, the numbers expressing quantities, properties, and so forth, used to describe and claim certain embodiments of the application are to be understood as being modified in some instances by the term "about," "approximate," or "substantially." For example, "about," "approximate" or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting effect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

We claim:

1. An acoustic output apparatus, comprising:
  at least one acoustic driver, each of the at least one acoustic driver is configured to output sounds through at least two sound guiding holes, the at least two sound guiding holes including a first sound guiding hole and a second sound guiding hole; and
  a supporting structure suitable for wearing on a user's body and configured to support the at least one acoustic driver, both the supporting structure and the at least one acoustic driver approach but not block a user's ear canal when a user wears the acoustic output apparatus, wherein:
    a ratio of a distance between the user's ear canal and a sound guiding hole that is closer to the user's ear canal among the first and second sound guiding holes to a distance between the first and second sound guiding holes is less than or equal to 3, the distance between the first sound guiding hole and the second sound guiding hole is less than or equal to 3 centimeters,
    the supporting structure includes a baffle, the first sound guiding hole and the user's ear canal being located on one side of the baffle, the second sound guiding hole is located on the other side of the baffle, a length of an acoustic route from the first sound guiding hole to the user's ear canal is less than a length of an acoustic route from the second sound guiding hole to the user's ear canal, and
    the at least two sound guiding holes include a third sound guiding hole and a fourth sound guiding hole, and a ratio of a distance between the third sound guiding hole and the baffle to a distance between the fourth sound guiding hole and the baffle is less than or equal to ⅔.

2. The acoustic output apparatus of claim 1, wherein the first and second sound guiding holes are located on a same side of the user's ear canal.

3. The acoustic output apparatus of claim 2, wherein the ratio of the distance between the user's ear canal and the sound guiding hole that is closer to the user's ear canal among the first and second sound guiding holes to the distance between the first and second sound guiding holes is less than or equal to 1.

4. The acoustic output apparatus of claim 3, wherein the ratio of the distance between the user's ear canal and the sound guiding hole that is closer to the user's ear canal among the first and second sound guiding holes to the distance between the first and second sound guiding holes is less than or equal to 0.6.

5. The acoustic output apparatus of claim 4, wherein the ratio of the distance between the user's ear canal and the sound guiding hole that is closer to the user's ear canal among the first and second sound guiding holes to the distance between the first and second sound guiding holes is less than or equal to 0.3.

6. The acoustic output apparatus of claim 1, wherein the distance between the first sound guiding hole and the second sound guiding hole is less than or equal to 2 centimeters.

7. The acoustic output apparatus of claim 6, wherein the distance between the first sound guiding hole and the second sound guiding hole is 1 centimeters.

8. The acoustic output apparatus of claim 1, wherein a ratio of a height of the baffle to the distance between the first and second sound guiding holes is less than or equal to 5.

9. The acoustic output apparatus of claim 8, wherein the ratio of the height of the baffle to the distance between the first and second sound guiding holes is less than or equal to 3.

10. The acoustic output apparatus of claim 9, wherein the ratio of the height of the baffle to the distance between the first and second sound guiding holes is less than or equal to 1.5.

11. The acoustic output apparatus of claim 1, wherein a ratio of a distance between a center of the baffle and a connection line between the first and second sound guiding holes to a height of the baffle is less than or equal to 2.

12. The acoustic output apparatus of claim 1, wherein the acoustic driver includes a vibration diaphragm, a first acoustic route from the vibration diaphragm to the first sound guiding hole is different from a second acoustic route from the vibration diaphragm to the second sound guiding hole.

13. The acoustic output apparatus of claim 12, wherein
a first side of the vibration diaphragm in the supporting structure is provided with a first chamber for transmitting sound, the first chamber being acoustically coupled with the first sound guiding hole, and
a second side of the vibration diaphragm in the supporting structure is provided with a second chamber for transmitting sound, the second chamber being acoustically coupled with the second sound guiding hole.

14. The acoustic output apparatus of claim 13, wherein a ratio of a length of the first acoustic route to a length of the second acoustic route is 0.5-2.

15. The acoustic output apparatus of claim 1, wherein the sounds output from the first and second sound guiding holes have different sound pressure amplitudes.

16. The acoustic output apparatus of claim 1, wherein the acoustic output apparatus further includes a controller configured to control a phase and an amplitude of the sounds generated by the at least one acoustic driver using a control signal such that the sounds output by the at least one acoustic driver through the first and second sound guiding holes have opposite phases.

* * * * *